(12) United States Patent
Takeda

(10) Patent No.: US 10,311,526 B2
(45) Date of Patent: Jun. 4, 2019

(54) MANAGEMENT SYSTEM AND METHOD FOR OPERATING A MINING MACHINE

(71) Applicant: Komatsu Ltd., Tokyo (JP)

(72) Inventor: Koji Takeda, Tama (JP)

(73) Assignee: Komatsu Ltd., Tokyo (JP)

( * ) Notice: Subject to any disclaimer, the term of this patent is extended or adjusted under 35 U.S.C. 154(b) by 676 days.

(21) Appl. No.: 14/361,072

(22) PCT Filed: Aug. 20, 2013

(86) PCT No.: PCT/JP2013/072221
§ 371 (c)(1),
(2) Date: May 28, 2014

(87) PCT Pub. No.: WO2015/025369
PCT Pub. Date: Feb. 26, 2015

(65) Prior Publication Data
US 2015/0178859 A1 Jun. 25, 2015

(51) Int. Cl.
*G06Q 50/02* (2012.01)
*G06Q 10/08* (2012.01)
(Continued)

(52) U.S. Cl.
CPC ....... *G06Q 50/02* (2013.01); *G06Q 10/06314* (2013.01); *G06Q 10/08* (2013.01); *E02F 9/2054* (2013.01)

(58) Field of Classification Search
CPC .............. G06Q 10/08; G06Q 10/0631; G06Q 10/06398; G01G 19/08; B60K 31/0008; G05D 1/0212; E02F 3/842
(Continued)

(56) References Cited

U.S. PATENT DOCUMENTS 5,390,125 A * 2/1995 Sennott .............. B60K 31/0008
342/357.24
5,546,093 A * 8/1996 Gudat ..................... G01S 19/53
342/357.31
(Continued)

FOREIGN PATENT DOCUMENTS

CA 2218731 A1 10/1996
CA 2815238 A1 5/2013
(Continued)

OTHER PUBLICATIONS

May, Meredith Augusta. Applications of queuing theory for open-pit truck/shovel haulage systems. Diss. Virginia Tech, 2013.*
(Continued)

*Primary Examiner* — Thomas L Mansfield
*Assistant Examiner* — Derick J Holzmacher
(74) *Attorney, Agent, or Firm* — Locke Lord LLP

(57) ABSTRACT

A management system includes an input device provided to a loading machine that performs, after a first loading work of loading a load onto a first haul machine positioned at a first loading position at a loading site of a mine is ended, a second loading work of loading a load onto a second haul machine that is already positioned, during the first loading work, at a second loading position different from the first loading position, and a processing device to which an operation signal generated by the input device is to be output, wherein the processing device specifies a start time of the second loading work based on the operation signal generated by the input device at a time when the first loading work is ended.

10 Claims, 12 Drawing Sheets

(51) Int. Cl.
*G06Q 10/06* (2012.01)
*E02F 9/20* (2006.01)

(58) Field of Classification Search
USPC ...... 701/50, 26; 340/989, 988; 705/28, 7.12, 705/7.42; 342/357.24
See application file for complete search history.

(56) References Cited

U.S. PATENT DOCUMENTS

| | | | | |
|---|---|---|---|---|
| 5,610,815 | A * | 3/1997 | Gudat | G01S 19/11 318/587 |
| 5,631,832 | A * | 5/1997 | Hagenbuch | G01G 19/08 340/989 |
| 5,752,207 | A * | 5/1998 | Sarangapani | G05D 1/0212 701/26 |
| 6,044,312 | A * | 3/2000 | Sudo | E02F 3/842 340/988 |
| 6,484,078 | B1 * | 11/2002 | Kageyama | G05D 1/0297 340/989 |
| 6,539,294 | B1 * | 3/2003 | Kageyama | E02F 3/842 180/168 |
| 6,778,097 | B1 * | 8/2004 | Kajita | E02F 3/437 340/12.5 |
| 6,856,879 | B2 | 2/2005 | Arakawa et al. | |
| 6,988,591 | B2 * | 1/2006 | Uranaka | E21F 13/00 187/247 |
| 8,374,927 | B2 * | 2/2013 | Roberts | G06Q 10/08 705/28 |
| 8,639,420 | B2 * | 1/2014 | Corcoran | G06Q 10/063 701/50 |
| 2002/0143461 | A1 * | 10/2002 | Burns | G05D 1/0297 701/117 |
| 2003/0069680 | A1 * | 4/2003 | Cohen | G06Q 10/0631 701/50 |
| 2004/0039527 | A1 * | 2/2004 | McDonald, Jr. | G01S 5/0027 701/469 |
| 2004/0040792 | A1 * | 3/2004 | Uranaka | E21C 41/26 187/382 |
| 2004/0148083 | A1 * | 7/2004 | Arakawa | G07C 5/008 701/50 |
| 2006/0026101 | A1 * | 2/2006 | Ogura | G07C 3/08 705/50 |
| 2006/0104404 | A1 * | 5/2006 | Blackburn | G07C 5/085 377/27 |
| 2006/0195348 | A1 * | 8/2006 | Peterkofsky | G06Q 10/0631 705/7.12 |
| 2007/0293996 | A1 * | 12/2007 | Mori | G01C 21/005 701/23 |
| 2009/0063222 | A1 * | 3/2009 | Doan | G06Q 10/00 705/7.13 |
| 2009/0088961 | A1 * | 4/2009 | Morey | G01G 19/10 701/124 |
| 2009/0216410 | A1 * | 8/2009 | Allen | G05D 1/0238 701/50 |
| 2010/0094687 | A1 * | 4/2010 | Waggaman, III | G06Q 10/06398 705/7.42 |
| 2012/0215378 | A1 * | 8/2012 | Sprock | E02F 9/205 701/2 |
| 2012/0330550 | A1 * | 12/2012 | Jensen | G09B 25/06 702/5 |
| 2013/0054133 | A1 * | 2/2013 | Lewis | G01C 21/3407 701/423 |
| 2013/0211712 | A1 | 8/2013 | Takeda | |
| 2013/0311153 | A1 * | 11/2013 | Moughler | G06Q 10/047 703/6 |
| 2013/0325208 | A1 * | 12/2013 | Osagawa | E02F 9/205 701/2 |
| 2014/0019042 | A1 * | 1/2014 | Sugawara | E02F 9/26 701/431 |
| 2014/0122162 | A1 * | 5/2014 | Baker | G06Q 10/06 705/7.27 |
| 2014/0146167 | A1 * | 5/2014 | Friend | G01S 17/023 348/118 |
| 2014/0244098 | A1 * | 8/2014 | Ueda | G06Q 50/02 701/29.3 |

FOREIGN PATENT DOCUMENTS

| | | | | |
|---|---|---|---|---|
| CA | 2882906 | A1 | 2/2015 | |
| CN | 202008731 | U | 10/2011 | |
| CN | 103116824 | A | 5/2013 | |
| CN | 203070357 | U | 7/2013 | |
| EP | 1441077 | A1 * | 7/2004 | G07C 5/008 |
| JP | 61-243586 | A | 10/1986 | |
| JP | 2005-339058 | A | 12/2005 | |
| JP | 2009-002109 | A | 1/2009 | |
| JP | 2010-244247 | A | 10/2010 | |
| JP | 2012-022611 | A | 2/2012 | |
| JP | 2012-043352 | A | 3/2012 | |
| JP | 2013-105278 | A | 5/2013 | |
| WO | WO-2004053293 | A1 * | 6/2004 | E21C 41/16 |
| WO | WO-2009048622 | A1 * | 4/2009 | E02F 9/2045 |
| WO | WO-2010124335 | A1 * | 11/2010 | E21C 41/26 |

OTHER PUBLICATIONS

Elevli, Sermin, and Birol Elevli. "Performance measurement of mining equipments by utilizing OEE." Acta Montanistica Slovaca 15.2 (2010): 95.*

Mkhatshwa, S. V. "Optimization of the loading and hauling fleet at Mamatwan open pit mine." Journal of the Southern African Institute of Mining and Metallurgy 109.4 (2009): 223-232.*

Krause, C. "Modelling open pit shovel-truck systems using the Machine Repair Model." Journal of the Southern African Institute of Mining and Metallurgy 107.8 (2007): 469-476.*

May, Meredith Augusta. Applications of queuing theory for open-pit truck/shovel haulage systems. Diss. Virginia Tech, 2013. (Year: 2013).*

Krause, C. "Modelling open pit shovel-truck systems using the Machine Repair Model." Journal of the Southern African Institute of Mining and Metallurgy 107.8 (2007): 469-476. (Year: 2007).*

Mkhatshwa, S. V. "Optimization of the loading and hauling fleet at Mamatwan open pit mine." Journal of the Southern African Institute of Mining and Metallurgy 109.4 (2009): 223-232. (Year: 2009).*

Elevli, Sermin, and Birol Elevli. "Performance measurement of mining equipments by utilizing OEE." Acta Montanistica Slovaca 15.2 (2010): 95. (Year: 2010).*

Office Action dated Oct. 21, 2015, issued for the Canadian Patent Application No. 2 878 018.

Office Action dated Aug. 28, 2014, issued for the corresponding Australian patent application No. 2013350339.

International Search Report and Written Opinion dated Sep. 24, 2013, issued for PCT/JP2013/072221.

Office Action dated Oct. 12, 2016, issued by the Canadian Patent Office, in corresponding Canadian Patent Application No. 2878018.

* cited by examiner

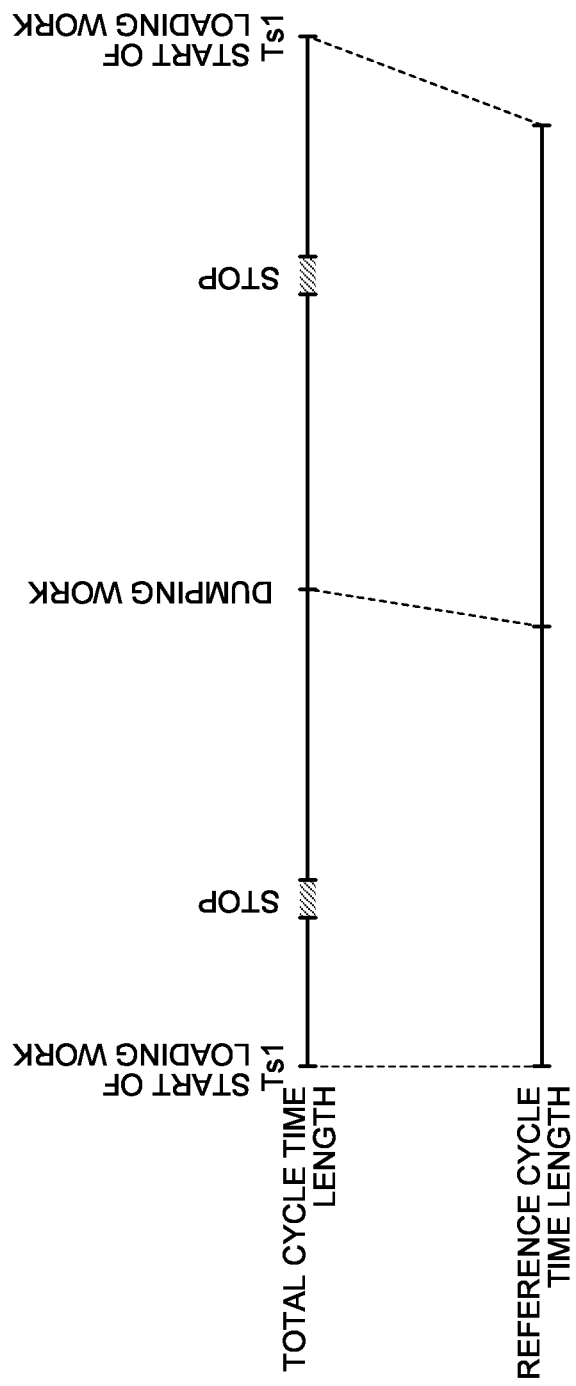

MANAGEMENT SYSTEM AND METHOD FOR OPERATING A MINING MACHINE

FIELD

The present invention relates to a management system and management method of a mining machine.

BACKGROUND

At a mining site of a mine, mining machines such as haul machines for transporting loads and loading machines for loading loads onto the haul machines operate. Patent Literature 1 discloses a technique related to a management system for managing a shipping work using an IC tag.

CITATION LIST

Patent Literature

Patent Literature 1: Japanese Laid-open Patent Publication No. 2009-002109

SUMMARY

Technical Problem

If time required for various operations of a haul machine in a mine is not managed, for example, appropriate assignment (deployment) of the haul machine in the mine becomes difficult, and as a result, the productivity of the mine is likely to be reduced.

The present invention has its object to provide a management system and a management method of a mining machine that are capable of preventing reduction in the productivity of a mine.

Solution to Problem

According to the present invention, a management system comprises: an input device provided to a loading machine that performs, after a first loading work of loading a load onto a first haul machine positioned at a first loading position at a loading site of a mine is ended, a second loading work of loading a load onto a second haul machine that is already positioned, during the first loading work, at a second loading position different from the first loading position; and a processing device to which an operation signal generated by the input device is to be output, wherein the processing device specifies a start time of the second loading work based on the operation signal generated by the input device at a time when the first loading work is ended.

The processing device can specify an end time of the second loading work based on the operation signal generated by the input device at a time when the second loading work is ended.

The operation signal generated by the input device at the time when the second loading work is ended can include an instruction signal for the second haul machine to leave the second loading position.

The operation signal generated by the input device at the time when the first loading work is ended can include an instruction signal for the first haul machine to leave the first loading position.

The management system can comprise: a position detection device that detects position information of the second haul machine, wherein the processing device can derive a wait time length from a time when the second haul machine arrives at the second loading position to a time when the second loading work is started, based on a detected result by the position detection device and the operation signal generated by the input device at the time when the first loading work is ended.

The haul machine can travel at the loading site and a dumping site where a dumping work of a load is to be performed, and on a haul road connecting the loading site and the dumping site, and the processing device can specify a start time of an operation of the second haul machine travelling in a loaded state, based on the operation signal generated by the input device at the time when the second loading work is ended.

The processing device can specify, based on position information of the second haul machine output from the position detection device, a start time and an end time of at least one of an operation of travelling of the second haul machine in an unloaded state, an operation of moving to a loading position at the loading site after a wait state at a wait position at an entrance of the loading site is released, and an operation of having a load loaded by the loading machine at the loading position.

The processing device can calculate a time length required for a cyclic operation of the second haul machine moving between the loading site and a dumping site where a dumping work of a load is to be performed.

According to the present invention, a management method comprise: outputting, to a processing device, an operation signal generated by an input device provided to a loading machine that performs, after a first loading work of loading a load onto a first haul machine positioned at a first loading position at a loading site of a mine is ended, a second loading work of loading a load onto a second haul machine that is already positioned, during the first loading work, at a second loading position different from the first loading position; and specifying a start time of the second loading work based on the operation signal generated by the input device at a time when the first loading work is ended.

According to the present invention, reduction in the productivity of a mine is prevented.

BRIEF DESCRIPTION OF DRAWINGS

FIG. 12 is a diagram illustrating a relationship between a total cycle time length and a standard cycle time length.

DESCRIPTION OF EMBODIMENTS

Hereinafter, an embodiment according to the present invention will be described with reference to the drawings, but the present invention is not restricted thereto.

<Outline of Management System of Mining Machine>

Figure 1:
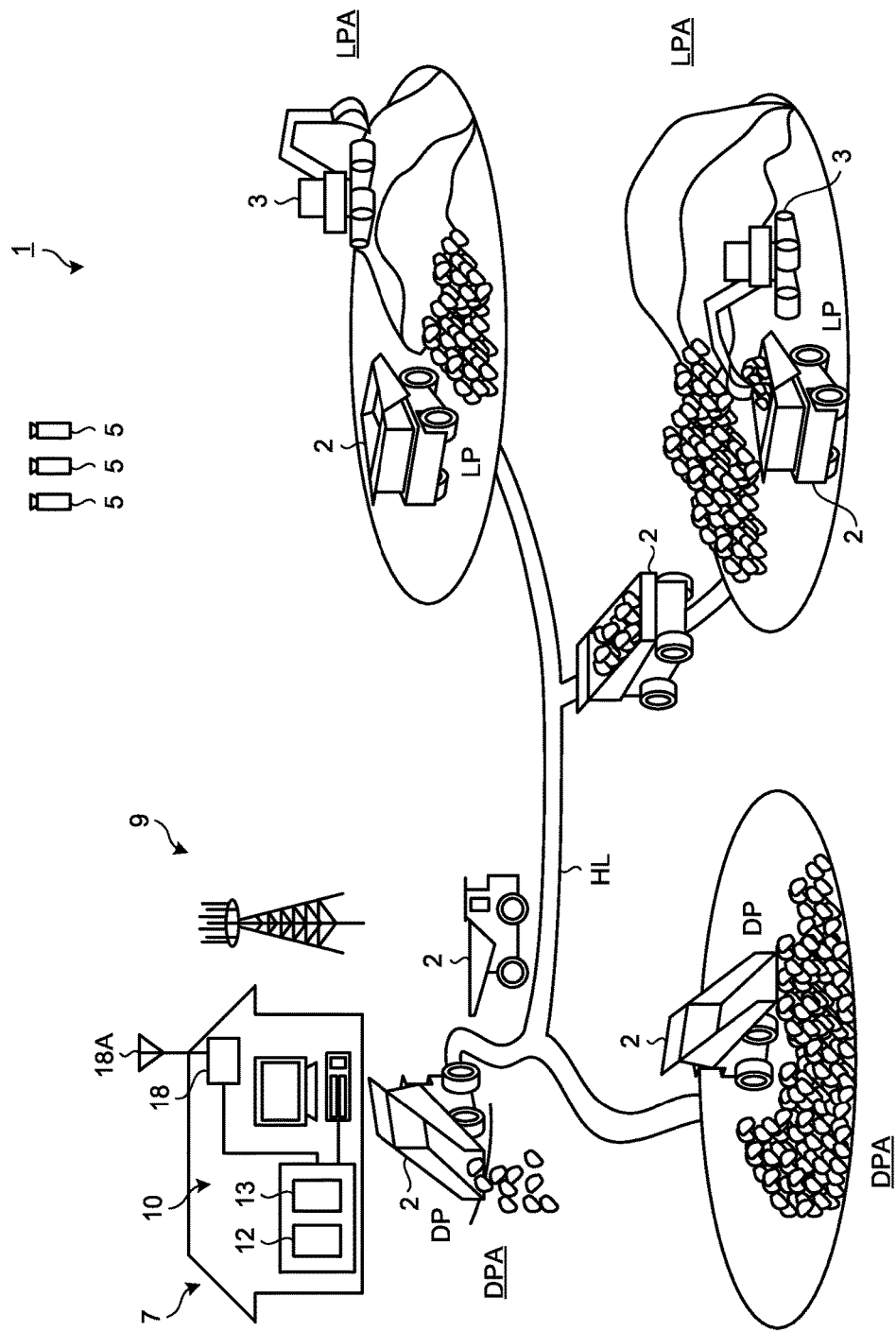
FIG. 1 is a diagram illustrating an example of a management system of a mining machine according to a present embodiment.

FIG. 1 is a diagram schematically illustrating a location where a management system 1 of a mining machine according to the present embodiment is applied. In FIG. 1, the management system 1 includes a management device 10, installed at a management facility 7, for managing a mining machine, and a communication system 9 capable of transferring information. The management system 1 manages the operation of a mining machine, and evaluates the productivity. A mining machine is a general term for machines and the like used at a mine for various works. In the present embodiment, an example will be given in which a dump truck 2 for transporting, as loads, earth, sand and the like generated by mining at the mine is managed as a haul machine which is a type of a mining machine. The dump truck 2 is a so-called unmanned dump truck which operates according to an instruction signal from the management device 10, and a worker (a driver) is not aboard the dump truck 2. Additionally, the mining machines may include a loading machine 3 such as an excavator for loading a load onto the dump truck 2.

At the mine, the dump truck 2 moves between a loading site LPA where a loading work of a load is performed and a dumping site DPA where a dumping work of the load is performed, by travelling on a haul road HL that leads to the loading site LPA and the dumping site DPA. The loading machine 3 loads a load onto the dump truck 2 at the loading site LPA. The dump truck 2 onto which a load has been loaded at a loading position LP at the loading site LPA travels on the haul road HL and moves to the dumping site DPA, and unloads the load at a dumping position DP at the dumping site DPA. The dump truck 2 which has unloaded the load at the dumping site DPA travels on the haul road HL and moves to the loading site LPA.

The communication system 9 includes a wireless communication system, and transfers information between the management device 10, the dump truck 2, and the loading machine 3. The management device 10, the dump truck 2, and the loading machine 3 are capable of wireless communication through the communication system 9.

In the present embodiment, the position of the dump truck 2 and the position of the loading machine 3 are detected by using a Global Positioning System (GPS). The GPS includes a GPS satellite 5, and detects a position in a coordinate system (GPS coordinate system) defining a latitude, a longitude, and an altitude. The position detected by the GPS includes coordinate data (coordinate values) of the latitude, the longitude, and the altitude. The position of the dump truck 2 and the position of the loading machine 3 at the mine are detected by the GPS. The position detected by the GPS is an absolute position defined on the GPS coordinate system. In the following, the position detected by the GPS is referred to as a GPS position as appropriate.

<Management Device>

Figure 2:
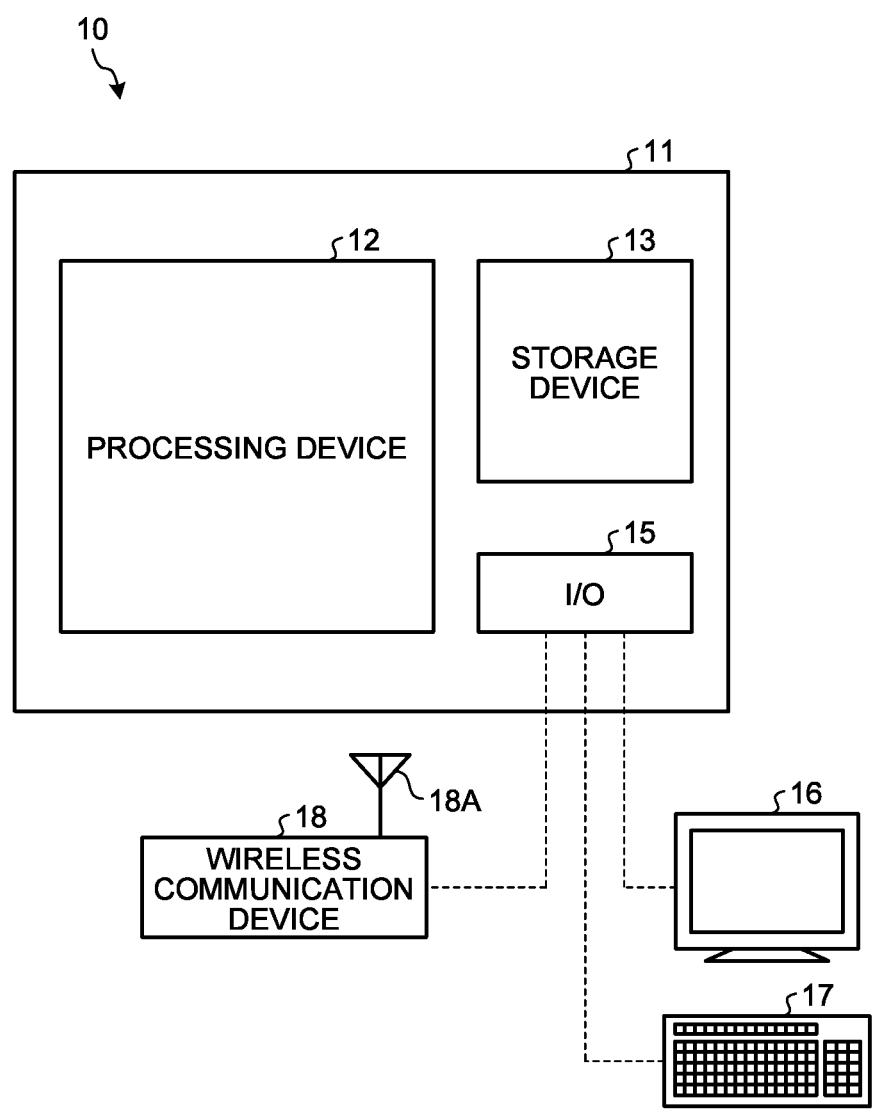
FIG. 2 is a diagram illustrating an example of a management device according to the present embodiment.

Next, the management device installed at the management facility 7 will be described. FIG. 2 is a functional block diagram illustrating an example of the management device according to the present embodiment. As illustrated in FIGS. 1 and 2, the management device 10 includes a computer system 11, a display device 16, an input device 17, and a wireless communication device 18.

The computer system 11 includes a processing device 12, a storage device 13, and an input/output unit 15. The display device 16, the input device 17, and the wireless communication device 18 are connected to the computer system 11 through the input/output unit 15. The input/output unit is used for input/output (interface) of information between the processing device 12 and at least one of the display device 16, the input device 17, and the wireless communication device 18.

The processing device 12 includes a CPU (Central Processing Unit), and performs various processes related to management of the dump truck 2. The processing device 12 processes information, acquired through the communication system 9, about the position of the dump truck 2, and generates a travel route CS along which the dump truck 2 is to travel. The travel route CS is generated on a GPS coordinate system, and the dump truck 2 travels along the travel route CS generated by the processing device 12 at least partially at the loading site LPA, the dumping site DPA, and the haul road HL.

The storage device 13 includes at least one of a RAM (Random Access Memory), a ROM (Read Only Memory), a flash memory, and a hard disk drive, and stores various types of information related to management of the dump truck 2. The display device 16 includes a flat panel display such as a liquid crystal display, and is capable of displaying information about the position of the dump truck 2. The input device 17 includes at least one of a keyboard, a touch panel, a mouse, and an operation switch, and an operation signal is input at the time of operation thereof. An operation signal input to the input device 17 is input to the processing device 12. That is, the input device 17 functions as an operation unit capable of inputting an operation signal to the processing device 12.

The communication system 9 includes the wireless communication device 18 that is installed at the management facility 7. The wireless communication device 18 includes an antenna 18A, and is connected to the processing device 12 through the input/output unit 15. The wireless communication device 18 is capable of receiving information that is transmitted from at least one of the dump truck 2 and the loading machine 3, and outputs received information to the processing device 12. Information that is received by the wireless communication device 18 is stored (recorded) in the storage device 13. The wireless communication device 18 is also capable of transmitting information to at least one of the dump truck 2 and the loading machine 3. For example, information about the travel route CS generated by the processing device 12 is transmitted to the dump truck 2 through the communication system 9.

<Dump Truck>

Figure 3:
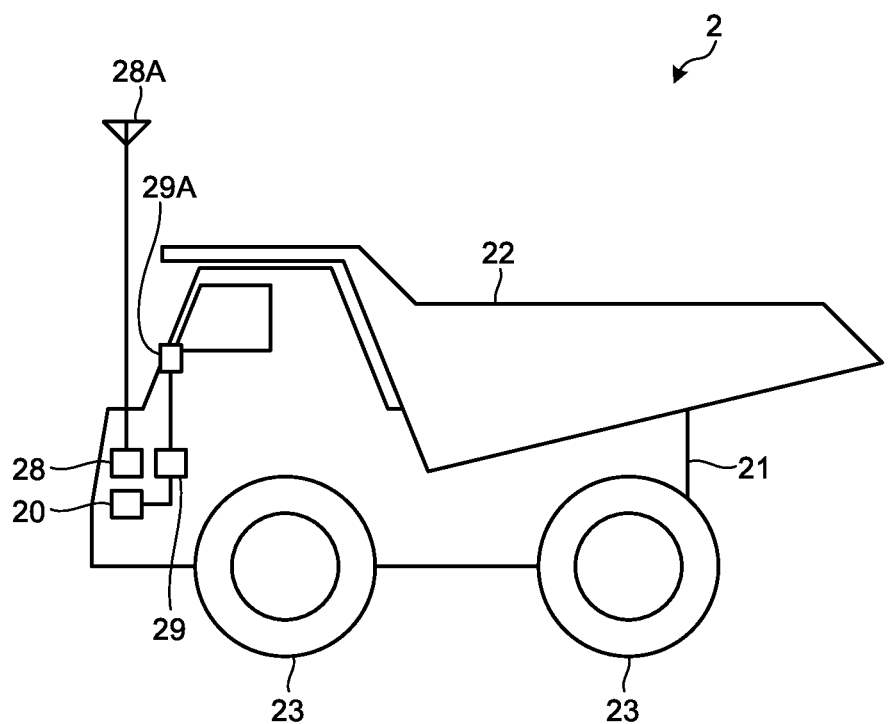
FIG. 3 is a diagram illustrating an example of a dump truck according to the present embodiment.
Figure 4:
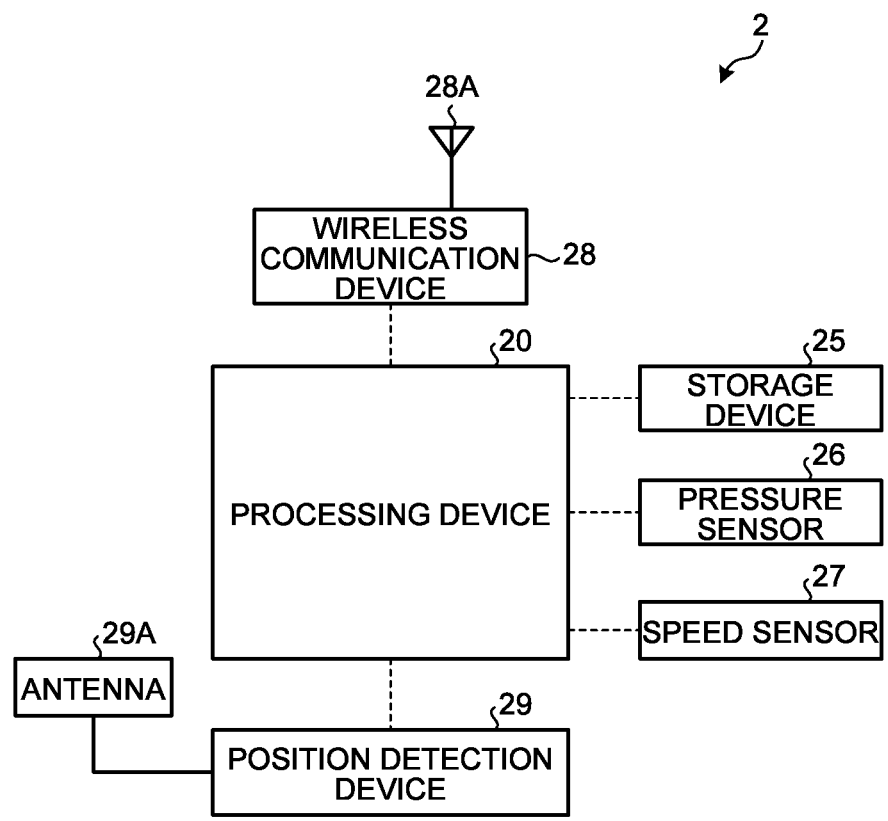
FIG. 4 is a diagram illustrating an example of a control system of the dump truck according to the present embodiment.

Next, the dump truck 2 will be described. FIG. 3 is a diagram schematically illustrating the external appearance of the dump truck 2 according to the present embodiment, and FIG. 4 is a functional block diagram of the dump truck 2 according to the present embodiment. As illustrated in FIGS. 3 and 4, the dump truck 2 includes a vehicle main body 21, a vessel 22, wheels 23, a processing device 20, a storage device 25, a pressure sensor 26, a speed sensor 27, a wireless communication device 28 to which an antenna 28A is connected, and a position detection device 29 to which an antenna 29A is connected.

A drive device including an internal-combustion engine is arranged in the vehicle main body 21, and the wheels 23 are driven by the drive device. The wheel 23 includes a tire and a wheel, and is rotated by power transmitted from the drive device.

The vessel 22 includes a platform onto which loads are to be loaded, and is tiltably arranged above the vehicle main body 21. A load is loaded onto the vessel 22 by the loading machine 3 in a loading work, and the vessel 22 is raised and the load is unloaded in a dumping work.

The pressure sensor 26 functions as a load sensor for performing detection of presence or absence of a load in the vessel 22 and detection of the weight (the loaded amount) of the load by detecting a load applied on a suspension cylinder and detecting a pressure of hydraulic oil of the suspension cylinder. The pressure sensor 26 is connected to the processing device 20, and outputs a detection signal to the processing device 20.

The speed sensor 27 detects the rotational speed of the wheels 23, and detects the travelling speed of the dump truck 2. The speed sensor 27 is connected to the processing device 20, and outputs a detection signal to the processing device 20.

The position detection device 29 includes a GPS receiver, and detects a GPS position of the dump truck 2. The position detection device 29 includes the antenna 29A for GPS that is installed on the dump truck 2, and detects the GPS position of the dump truck 2 by detecting the GPS position of the antenna 29A. The position detection device 29 is connected to the processing device 20, and outputs a detection signal to the processing device 20.

The processing device includes a CPU (Central Processing Unit), and performs various processes related to management of the dump truck 2. The processing device 20 controls the travelling of the dump truck 2 in such a way that the dump truck 2 travels along the travel route CS generated by the processing device 12. Control of the travelling of the dump truck 2 includes control of the operation of the dump truck 2 including the operation of at least one of steering, an accelerator and a brake.

The storage device includes at least one of a RAM (Random Access Memory), a ROM (Read Only Memory), a flash memory, and a hard disk drive, and stores various types of information related to management of the dump truck 2.

The communication system 9 includes the wireless communication device 28 installed in the dump truck 2. The wireless communication device 28 includes the antenna 28A, and is connected to the processing device 20. The wireless communication device 28 is capable of receiving information (including instruction signals) transmitted from at least one of the management device and the loading machine 3, and outputs received information to the processing device 20. Information received by the wireless communication device 28 is stored (registered) in the storage device 25. The processing device is capable of controlling the travelling of the dump truck 2 according to an instruction signal received by the wireless communication device 28. The wireless communication device 28 is also capable of transmitting information to at least one of the management device and the loading machine 3. For example, the detection signal of at least one of the pressure sensor 26, the speed sensor 27, and the position detection device 29 is transmitted to the management device through the communication system 9.

<Loading Machine>

Figure 5:
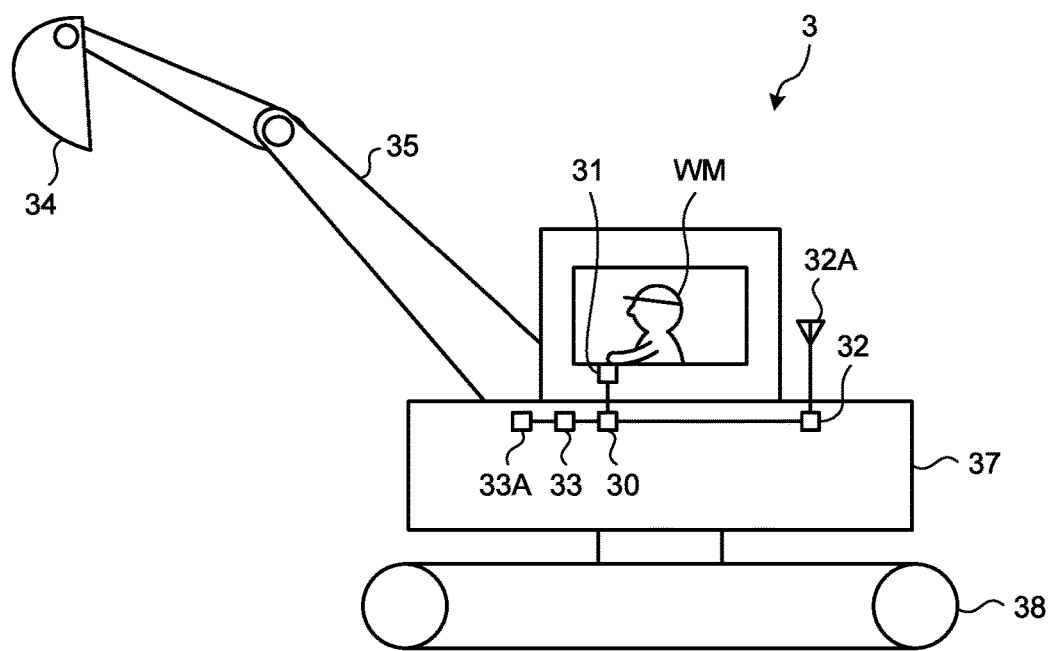
FIG. 5 is a diagram illustrating an example of a loading machine according to the present embodiment.
Figure 6:
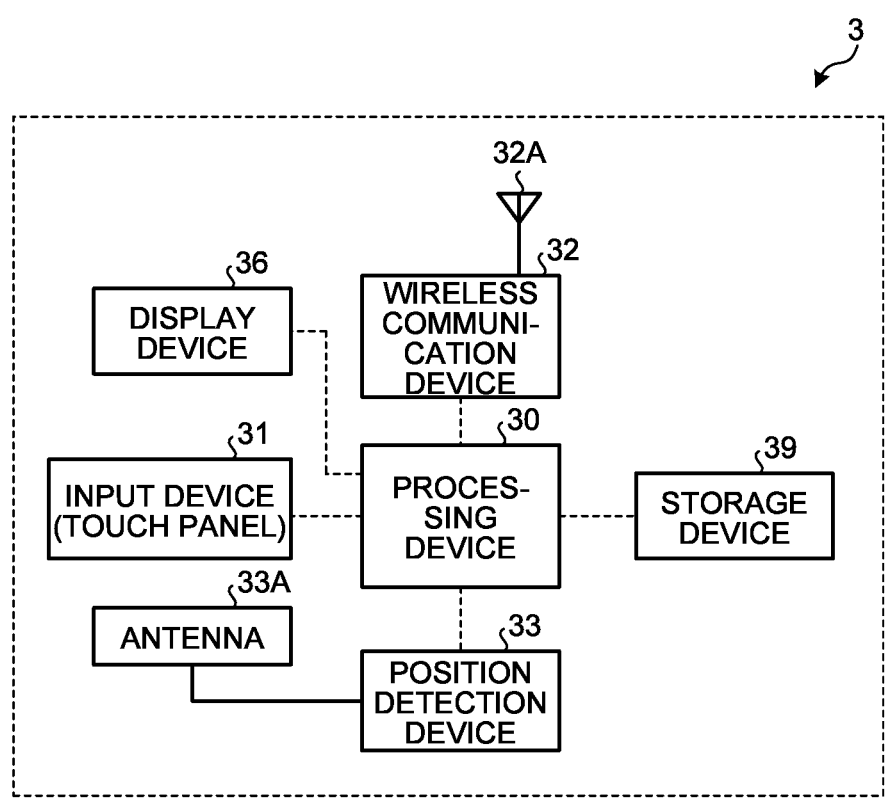
FIG. 6 is a diagram illustrating an example of a control system of the loading machine according to the present embodiment.

Next, the loading machine 3 will be described. FIG. 5 is a diagram schematically illustrating the external appearance of the loading machine 3 according to the present embodiment, and FIG. 6 is a functional block diagram of the loading machine 3 according to the present embodiment. As illustrated in FIGS. 5 and 6, the loading machine 3 is an excavator including a travelling body 38, a swinging body 37, an arm 35, a bucket 34, a processing device 30, a storage device 39, a wireless communication device 32 to which an antenna 32A is connected, a position detection device 33 to which an antenna 33A is connected, a display device 36, and an input device 31. In the present embodiment, a worker WM gets on the loading machine 3, and a loading work is performed by the operation by the worker WM. In the present embodiment, an example is cited where the loading machine 3 is an excavator, but the loading machine 3 may alternatively be a wheel loader.

The position detection device 33 includes a GPS receiver, and detects a GPS position of the loading machine 3. The position detection device 33 includes the antenna 33A for GPS that is installed on the loading machine 3, and detects the GPS position of the loading machine 3 by detecting the GPS position of the antenna 33A. The position detection device 33 is connected to the processing device 30, and outputs a detection signal to the processing device 30.

The processing device includes a CPU (Central Processing Unit), and performs various processes related to management of the loading work of the loading machine 3. The storage device 39 includes at least one of a RAM (Random Access Memory), a ROM (Read Only Memory), a flash memory, and a hard disk drive, and stores various types of information related to management of the loading work of the loading machine 3. The display device 36 includes a flat panel display such as a liquid crystal display, and is capable of displaying at least one of information about the position of the dump truck 2, information about the position of the loading machine 3, and information about an operation state of the loading machine 3 (for example, water temperature of the engine).

The input device 31 includes at least one of a keyboard, a touch panel, and an operation switch, and generates an operation signal by being operated. An operation signal that is generated by the input device 31 is input to the processing device 30. That is, the input device 31 functions as an operation unit capable of inputting an operation signal to the processing device 30. The worker (driver) WM on the loading machine 3 is capable of generating an operation signal by operating the input device 31, and of inputting the operation signal to the processing device through the input device 31.

The communication system 9 includes the wireless communication device 32 installed in the loading machine 3. The wireless communication device 32 includes the antenna 32A, and is connected to the processing device 30. The wireless communication device 32 is capable of receiving information (including instruction signals) transmitted from at least one of the management device and the dump truck 2, and outputs received information to the processing device 30. Information received by the wireless communication device 32 is stored (registered) in the storage device 39. The wireless communication device 32 is also capable of transmitting information to at least one of the management device and the dump truck 2. For example, an operation signal generated by the input device 31 is transmitted to at least one of the management device and the dump truck 2 through the communication system 9.

<Operation of Dump Truck 2>

Next, an example of the operation of the dump truck 2 will be described. The dump truck 2 repeats a series of operations of leaving the loading site LPA for the dumping site DPA after a loading process of a load is performed by the loading machine 3 at the loading position LP at the loading site LPA of the mine, performing a dumping work of the load at the dumping position DP at the dumping site DPA after arriving at the dumping site DPA after travelling along the haul road HL, leaving the dumping site DPA for the loading site LPA after performing the dumping work, having a loading work performed thereon at the loading position DP after arriving at the loading site LPA after travelling along the haul road HL, and leaving the loading site LPA again for the dumping site DPA.

The loading site LPA is an area (place) in the mine where a loading work of a load is performed, and the loading position LP is a position (loading spot), at the loading site LPA, where the loading work of a load is performed, and the loading work is a work of loading a load onto the dump truck 2. The dumping site DPA is an area (place) in the mine where a dumping work of a load is performed, and the dumping position DP is a position (unloading spot), at the dumping site DPA, where the dumping work of a load is performed, and the dumping work is a work of removing (unloading) a load from the dump truck 2. The haul road HL connects the loading site LPA and the dumping site DPA, and the dump truck 2 is enabled to move between the loading site LPA and the dumping site DPA by travelling on the haul road HL. In the present embodiment, the loading position LP and the dumping position DP are specified by the processing device 12. Each of the loading position LP and the dumping position DP may be a part of the travel route CS generated by the processing device 12.

In the following description, a series of operations of the dump truck 2 from leaving the loading site LPA, arriving at the loading site LPA through the dumping site DPA where the load is unloaded, and leaving the loading site LPA again is referred to as a cyclic operation as appropriate, and one cyclic operation is referred to as one cycle as appropriate. The cyclic operation includes the operation of the dump truck 2 moving between the loading site LPA and the dumping site DPA.

Additionally, the definition of one cycle is not restricted to the above, and a series of operations from arriving at the loading site LPA, then having the loading work, and the dumping work at the dumping site DPA performed thereon, and then arriving at the loading site LPA again may be defined as one cycle, or a series of operations from leaving the dumping site DPA, and then, after the loading site LPA, leaving the dumping site DPA again may be defined as one cycle. Additionally, in the case in which a second loading work is performed after one cyclic operation after a first loading work is performed, the loading position LP in the first loading work and the loading position LP in the second loading work may be the same position or different positions. Additionally, in the case in which a second dumping work is performed after one cyclic operation after a first dumping work is performed, the dumping position DP in the first dumping work and the dumping position DP in the second dumping work may be the same position or different positions.

Moreover, as illustrated in FIG. 1, there may be a plurality of loading sites LPA or a plurality of dumping sites DPA in the mine. In the case in which a second loading work is performed after one cyclic operation after a first loading work is performed, the loading site LPA where the first loading work is performed and the loading site LPA where the second loading work is performed may be the same loading site LPA or different loading sites LPA. Additionally, in the case in which a second dumping work is performed after one cyclic operation after a first dumping work is performed, the dumping site DPA where the first dumping work is performed and the dumping site DPA where the second dumping work is performed may be the same dumping site DPA or different dumping sites DPA.

In a cyclic operation, the dump truck 2 performs a plurality of operations. The plurality of operations of the dump truck 2 include at least one of an unloading operation of performing a dumping work of a load at the dumping site DPA, an empty travelling operation of travelling, after a dumping work at the dumping site DPA, to the entrance of the loading site LPA in an empty state where no load is loaded, an entrance wait operation of waiting at the entrance of the loading site LPA after arriving at the entrance, a spot operation of moving to the loading position LP at the loading site LPA after the wait state at a wait position at the entrance of the loading site LPA is released, a loading operation of having a load loaded thereon by the loading machine 3 at the loading position LP, and a loaded travelling operation of travelling from the loading site LPA to the dumping site DPA in a loaded state where a load is loaded thereon. Also, the plurality of operations of the dump truck 2 include a travelling stop operation of stopping travelling on the haul road HL.

Position information of the dump truck 2 is detected using GPS in at least a part of the cyclic operation. That is, the GPS position of the dump truck 2 is detected by the position detection device 29 including the GPS receiver installed in the dump truck 2. Information about the GPS position of the dump truck 2 detected by the position detection device 29 is output to the processing device 12 of the management device 10 through the communication system 9.

In the present embodiment, the processing device 12 specifies both or one of a start time and an end time of at least one operation among the plurality of operations of the dump truck 2 described above, based on the position information of the dump truck 2 output from the position detection device 29. For example, the processing device 12 specifies, based on the GPS position of the dump truck 2 output from the position detection device 29, each of a start time and an end time of the unloading operation, a start time and an end time of the empty travelling operation, a start time and an end time of the entrance wait operation, a start time and an end time of the spot travelling operation, a start time and an end time of the loading operation, a start time and an end time of the loaded travelling operation, and a start time and an end time of the travelling stop operation.

Also, the processing device 12 is capable of deriving the time length required for an operation of the dump truck 2 based on the start time and the end time of the operation. The processing device 12 is capable of deriving the dumping work time length required by the dump truck 2 for a dumping work based on the start time and the end time of the unloading operation, of deriving the empty travelling time length when the dump truck 2 travelled in an unloaded state, based on the start time and the end time of the empty travelling operation, of deriving the entrance wait time length when the dump truck 2 waited at the entrance of the loading site LPA, based on the start time and the end time of the entrance wait operation, of deriving the spot time length required by the dump truck 2 to move to the loading position LP at the loading site LPA after the wait state at the wait position at the entrance of the loading site LPA has been released, based on the start time and the end time of the spot operation, of deriving the loading work time length required by the dump truck 2 for a loading work, based on the start time and the end time of the loading operation, of deriving the loaded travelling time length when the dump truck 2 travelled in a loaded state, based on the start time and the end time of the loaded travelling operation, and of deriving the stopped time length when travelling of the dump truck 2 was stopped on the haul road HL, based on the start time and the end time of the travelling stop operation.

In a mine, a plurality of dump trucks 2 operate, and each of the plurality of dump trucks 2 performs the cyclic operation. Information about the GPS position of each of the plurality of dump trucks 2 is output to the processing device 12 of the management device through the communication system 9. The processing device 12 specifies the start time and the end time of the operation of each dump truck 2 based on the position information of each of the plurality of dump trucks 2, and derives the time length required for the operation.

<Operations of Dump Truck and Loading Machine in One Cycle>

Figure 7:
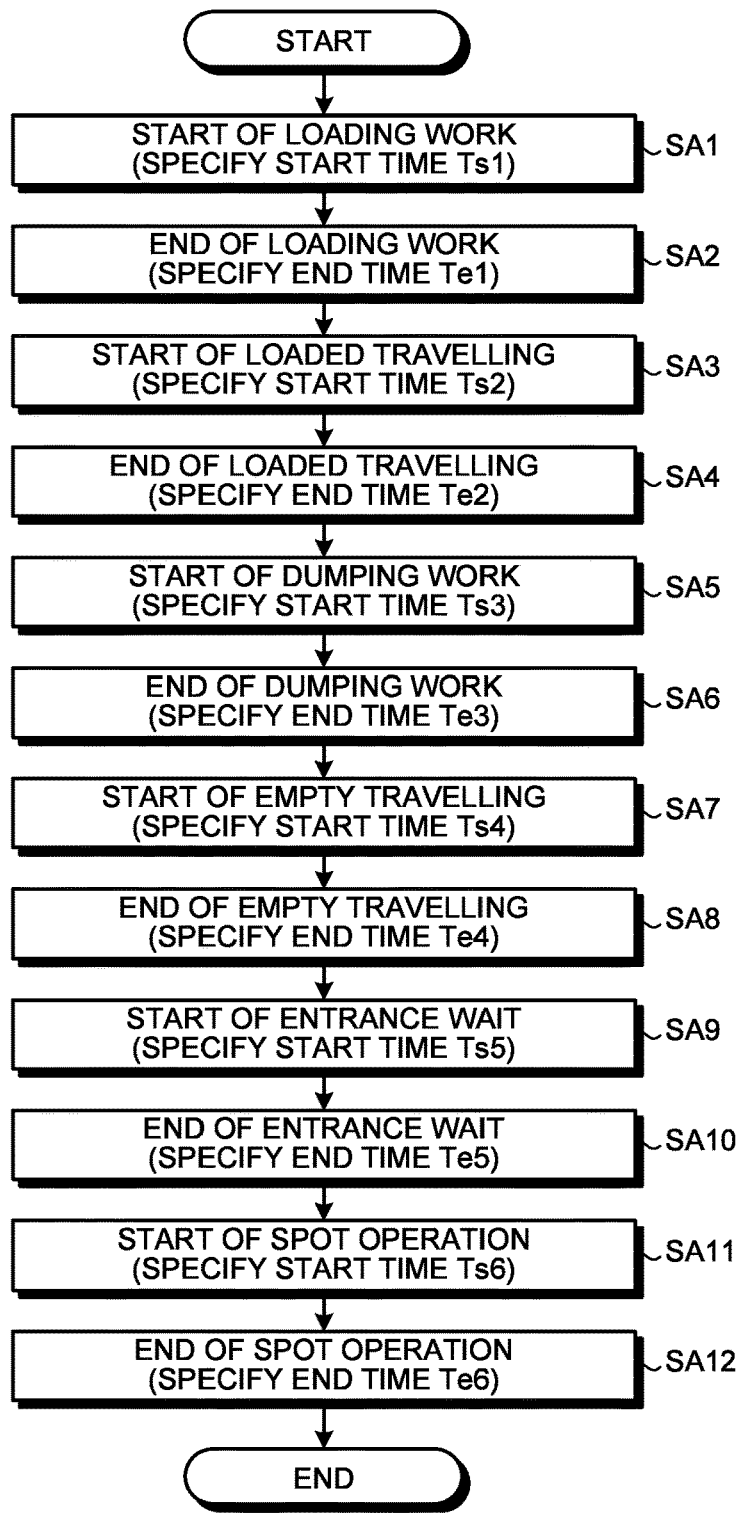
FIG. 7 is a flow chart illustrating an example of an operation in one cycle of the dump truck according to the present embodiment.
Figure 8:
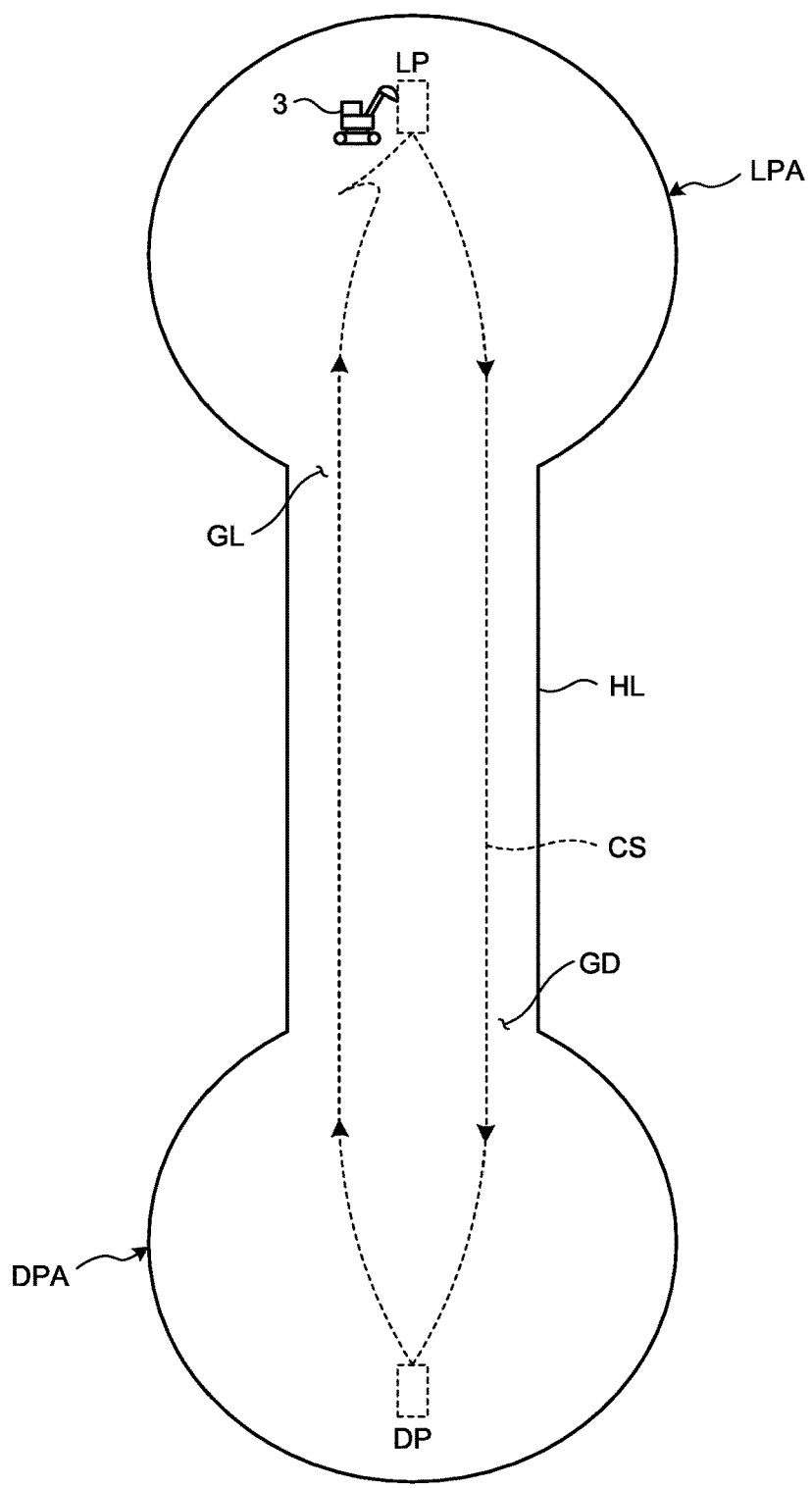
FIG. 8 is a schematic diagram illustrating an example of an operation in one cycle of the dump truck according to the present embodiment.

Next, an example of an operation in one cycle of the dump truck 2 will be described with reference to the flow chart of FIG. 7 and the schematic diagram of FIG. 8.

A loading work on a dump truck 2 positioned at a loading position LP at a loading site LPA is started (step SA1). Information about the GPS position of the dump truck 2 at the time of the loading work at the loading position LP is output to the processing device 12 of the management device through the communication system 9.

In the present embodiment, the processing device 12 specifies the time of positioning of the dump truck 2 at the loading position LP as a start time Ts1 of the loading operation of the dump truck 2. As described above, the dump truck 2 travels along the travel route CS generated by the processing device 12, and the travel route CS includes the loading position LP. That is, the loading position LP is specified by the processing device 12 on the GPS coordinate system, and the processing device 12 is capable of determining, based on the information about the GPS position of the dump truck 2 output from the position detection device 29, whether or not the dump truck 2 is positioned at the loading position LP. The processing device 12 determines whether or not the dump truck 2 is positioned at the loading position LP, based on the travel route CS (loading position LP) generated by the processing device 12 and the detection results of the position detection device 29, and specifies the time of positioning of the dump truck 2 at the loading position LP as the start time Ts1 of the loading operation of the dump truck 2.

When the loading work is finished, the input device 31 is operated by the worker WM on the loading machine 3 (step SA2). The input device 31 includes a touch panel, and the touch panel includes an operation unit (input button) for notifying the dump truck 2 and the management device of the end of the loading work. The worker WM operates the operation unit (presses the input button) when the loading work is finished. The operation signal generated by the input device 31 is output to each of the processing device 12 of the management device and the processing device of the dump truck 2 through the communication system 9.

In the present embodiment, the processing device 12 specifies an end time Te1 of the loading operation of the dump truck 2 based on the operation signal generated by the input device 31 at the time of end of the loading work. Additionally, the processing device 12 may specify the time when an operation signal is generated by the input device 31 while the dump truck 2 is at the loading position LP as the end time Te1. That is, the end time Te1 may be the time when the input device 31 is operated and an operation signal is generated (the time when the operation signal is input to the processing device 12) in a state where the loading position LP specified by the processing device 12 and the GPS position of the dump truck 2 detected by the position detection device 29 coincide with each other.

In the present embodiment, the operation signal generated by the input device 31 includes an instruction signal for the dump truck 2 to leave the loading position LP. When the operation signal generated by the input device 31 is input to the processing device of the dump truck 2 through the communication system 9, the dump truck 2 leaves the loading position LP for the dumping site DPA. Additionally, the processing device 12 of the management device which has received the operation signal from the input device 31 may instruct, through the communication system 9, the dump truck 2 to leave the loading position LP.

Additionally, the processing device 12 may specify the end time Te1 based on the position information of the dump truck 2 output from the position detection device 29. When the loading operation is finished and the dump truck 2 starts travelling, the position of the dump truck 2 changes, and thus, the processing device 12 is enabled to determine whether or not the dump truck 2 has left the loading position LP, based on the information about the GPS position of the dump truck 2 output from the position detection device 29. The processing device 12 may determine whether or not the dump truck 2 has started to move from the loading position LP, based on the detection results of the position detection device 29, and may specify the time when the dump truck 2 started to move from the loading position LP as the end time Te1 of the loading operation of the dump truck 2.

When the loading operation is finished, the dump truck 2 starts the loaded travelling operation (step SA3). In the present embodiment, the processing device 12 specifies a start time Ts2 of the loaded travelling operation of the dump truck 2 based on the operation signal generated by the input device 31 at the time of end of the loading work. That is, in the present embodiment, the start time Ts2 of the loaded travelling operation is the time when the input device 31 is operated and the operation signal is generated (the time when the operation signal is input to the processing device 12), and is the same as the end time Te1 of the loading operation. Additionally, the processing device 12 may determine whether or not the dump truck 2 has started to move from the loading position LP, based on the detection results of the position detection device 29, and specify the time when the dump truck 2 has started to move from the loading position LP as the start time Ts2 of the loaded travelling operation of the dump truck 2. Additionally, the processing device 12 may specify the time when the operation signal is generated by the input device 31 at the time of end of the loading work as the end time Te1, and specify the time when it is determined, based on the detection results of the position detection device 29, that the dump truck 2 has started to move from the loading position LP as the start time Ts2.

The dump truck 2 travels in a loaded state along the travel route CS generated by the processing device 12, and arrives at an entrance GD of the dumping site DPA. The dump truck 2 which has arrived at the entrance GD of the dumping site DPA enters the dumping site DPS from the entrance GD, travels toward the dumping position DP, and arrives at the dumping position DP (step SA4). In the present embodiment, the processing device 12 specifies the time of positioning of the dump truck 2 at the dumping position DP as the end time Te2 of the loaded travelling operation of the dump truck 2. As described above, the dump truck 2 travels along the travel route CS generated by the processing device 12, and the travel route CS includes the dumping position DP. That is, the dumping position DP is specified by the processing device 12 on the GPS coordinate system, and the processing device 12 is capable of determining, based on the information about the GPS position of the dump truck 2 output from the position detection device 29, whether or not the dump truck 2 is positioned at the dumping position DP. The processing device 12 determines whether or not the dump truck 2 is positioned at the dumping position DP, based on the travel route CS (dumping position DP) generated by the processing device 12 and the detection results of the position detection device 29, and specifies the time of positioning of the dump truck 2 at the dumping position DP as the end time Te2 of the loaded travelling operation of the dump truck 2.

Additionally, an intersection is sometimes present on the haul road HL from the loading site LPA to the dumping site DPA. In this case, the processing device 12 may divide the loaded travelling operation of the dump truck 2 into a first loaded travelling operation from the loading site LPA to the intersection of the haul road HL, and a second loaded travelling operation from the intersection of the haul road HL to the dumping site DPA, and specify the start time and the end time of the first loaded travelling operation of the dump truck 2, and the start time and the end time of the second loaded travelling operation. One or both of the end time of the first loaded travelling operation and the start time of the second loaded travelling operation include the time when the dump truck 2 has passed the intersection of the haul road HL, and may be specified based on the GPS position of the dump truck 2. Also, in the case of branching from the intersection of the haul road HL into a haul road HL to the first dumping site DPA and a haul road HL to a second dumping site DPA, the processing device 12 may divide the loaded travelling operation of the dump truck 2 into a third loaded travelling operation from the intersection of the haul road HL to the first dumping site DPA and a fourth loaded travelling operation from the intersection of the haul road HL to the second dumping site DPA, and specify the start time and the end time of the third loaded travelling operation of the dump truck 2 and the start time and the end time of the fourth loaded travelling operation.

One or both of the start time of the third loaded travelling operation and the start time of the fourth loaded travelling operation include the time when the dump truck 2 has passed the intersection of the haul road HL, and may be specified based on the GPS position of the dump truck 2.

When the loaded travelling operation is finished, the dump truck 2 starts the unloading operation (step SA5). The processing device 12 outputs (transmits) an instruction signal regarding a dumping work to the dump truck 2 which is positioned at the dumping position DP. The processing device of the dump truck 2 which has received the instruction signal raises the vessel 22. The load is thereby unloaded from the vessel 22 (step SA6). When the load is unloaded from the vessel 22 and the dumping work is finished, the dump truck 2 leaves the dumping position DP for the loading site LPA.

In the present embodiment, the processing device 12 specifies the time of positioning of the dump truck 2 at the dumping position DP as a start time Ts3 of the unloading operation of the dump truck 2. That is, in the present embodiment, the start time Ts3 of the unloading operation is the same as the end time Te2 of the loaded travelling operation, and the end time Te2 is specified as the start time Ts3. Also, since the time length required for the dumping work is as short as several seconds, in the present embodiment, the processing device 12 specifies the start time Ts3 of the unloading operation as an end time Te3 of the unloading operation. That is, in the present embodiment, the end time Te3 of the unloading operation is the same as the start time Ts3 of the unloading operation. Additionally, the processing device 12 may specify the time of start of the raising the vessel 22 by output of the instruction signal for the dumping work as the start time Ts3 of the unloading operation.

Additionally, the processing device 12 may specify the end time Te2 and the start time Ts3 to be different. For example, the processing device 12 may specify the time of positioning of the dump truck 2 at the dumping position DP as the end time Te2, and the time of start of raising the vessel 22 as the start time Ts3. Additionally, the processing device 12 may specify the start time Ts3 and the end time Te3 to be different. For example, the processing device 12 may specify the time of output of the instruction signal for the dumping work or the time of start of raising the vessel 22 as the start time Ts3, and specify the time when it is determined based on the detection results of the pressure sensor 26 capable of detecting the weight of the load in the vessel 22 that the unloading of the load has finished as the end time Te3.

Additionally, the processing device 12 may specify the end time Te3 of the unloading operation of the dump truck 2 based on the position information of the dump truck 2 output from the position detection device 29. When the dumping work is finished and the dump truck 2 starts travelling, the position of the dump truck 2 changes, and thus, the processing device 12 is enabled to determine whether or not the dump truck 2 has left the dumping position DP, based on the information about the GPS position of the dump truck 2 output from the position detection device 29. The processing device 12 may determine whether or not the dump truck 2 has started to move from the dumping position DP, based on the detection results of the position detection device 29, and may specify the time when the dump truck 2 started to move from the dumping position DP as the end time Te3 of the unloading operation of the dump truck 2.

When the unloading operation is finished, the dump truck 2 starts the empty travelling operation (step SA7). In the present embodiment, since the time length required for the dumping work is short, the start time Ts3 (or the end time Te3) of the unloading operation is specified as a start time Ts4 of the empty travelling operation. That is, in the present embodiment, the start time Ts3, the end time Te3, and the start time Ts4 are the same. Additionally, the start time Ts3 (or the end time Te3) and the start time Ts4 may be different.

Additionally, the processing device 12 may specify the start time Ts4 of the empty travelling operation of the dump truck 2 based on the position information of the dump truck 2 output from the position detection device 29. The processing device 12 may determine, based on the detection results of the position detection device 29, whether or not the dump truck 2 has started to move from the dumping position DP, and specify the time when the dump truck 2 has started to move from the dumping position DP as the start time Ts4 of the empty travelling operation of the dump truck 2.

The dump truck 2 travels in an empty state along the travel route CS generated by the processing device 12, and arrives at an entrance GL of the loading site LPA. The dump truck 2 thus ends the empty travelling operation on the haul road HL (step SA8). In the present embodiment, the processing device 12 specifies the time when the dump truck 2 has arrived at the entrance GL of the loading site LPA as an end time Te4 of the empty travelling operation of the dump truck 2. As described above, the dump truck 2 travels along the travel route CS generated by the processing device 12, and the travel route CS includes the position of the entrance GL. That is, the position of the entrance GL is specified by the processing device 12 on the GPS coordinate system, and the processing device 12 is capable of determining, based on the information about the GPS position of the dump truck 2 output from the position detection device 29, whether or not the dump truck 2 has arrived at the entrance GL. The processing device 12 determines whether or not the dump truck 2 has arrived at the entrance GL, based on the travel route CS (the position of the entrance GL) generated by the processing device 12 and the detection results of the position detection device 29, and specifies the time when the dump truck 2 has arrived at the entrance GL as the end time Te4 of the empty travelling operation of the dump truck 2.

Additionally, an intersection is sometimes present on the haul road HL from the dumping site DPA to the loading site LPA. In this case, the processing device 12 may divide the empty travelling operation of the dump truck 2 into a first empty travelling operation from the dumping site DPA to the intersection of the haul road HL, and a second empty travelling operation from the intersection of the haul road HL to the loading site LPA, and specify the start time and the end time of the first empty travelling operation of the dump truck 2, and the start time and the end time of the second empty travelling operation. One or both of the end time of the first empty travelling operation and the start time of the second empty travelling operation include the time when the dump truck 2 has passed the intersection of the haul road HL, and may be specified based on the GPS position of the dump truck 2. Also, in the case of branching from the intersection of the haul road HL into a haul road HL to the first loading site LPA and a haul road HL to a second loading site LPA, the processing device 12 may divide the empty travelling operation of the dump truck 2 into a third empty travelling operation from the intersection of the haul road HL to the first loading site LPA and a fourth empty travelling operation from the intersection of the haul road HL to the second loading site LPA, and specify the start time and the end time of the third empty travelling operation of the dump truck 2 and the start time and the end time of the fourth empty travelling operation. One or both of the start time of the third empty travelling operation and the start time of the fourth empty travelling operation include the time when the dump truck 2 has passed the intersection of the haul road HL, and may be specified based on the GPS position of the dump truck 2.

In the present embodiment, the number of dump trucks 2 that may be positioned in (that may enter) the loading site LPA is restricted. Accordingly, in the case in which a predetermined number of dump trucks 2 are already present at the loading site LPA, a dump truck 2 arriving at the entrance GL of the loading site LPA waits (stops) at the entrance GL until at least one of the dump trucks 2 at the loading site LPA moves out of the loading site LPA. Then, the dump truck 2 at the entrance GL moves to the loading position LP at the loading site LPA when at least one of the dump trucks 2 at the loading site LPA has moved out of the loading site LPA and the wait state of the dump truck 2 waiting at the entrance GL is released. Additionally, in the case in which a predetermined number of dump trucks 2 are already present at the loading site LPA, the timing of release of the wait state of the dump truck 2 arriving at the entrance GL of the loading site LPA may be the time when at least one of the dump trucks 2 at the loading site LPA has moved out of the loading site LPA, or may be the time when a dump truck 2 whose loading work of a load at a loading position LP has finished starts to move from the loading position LP.

Figure 9:
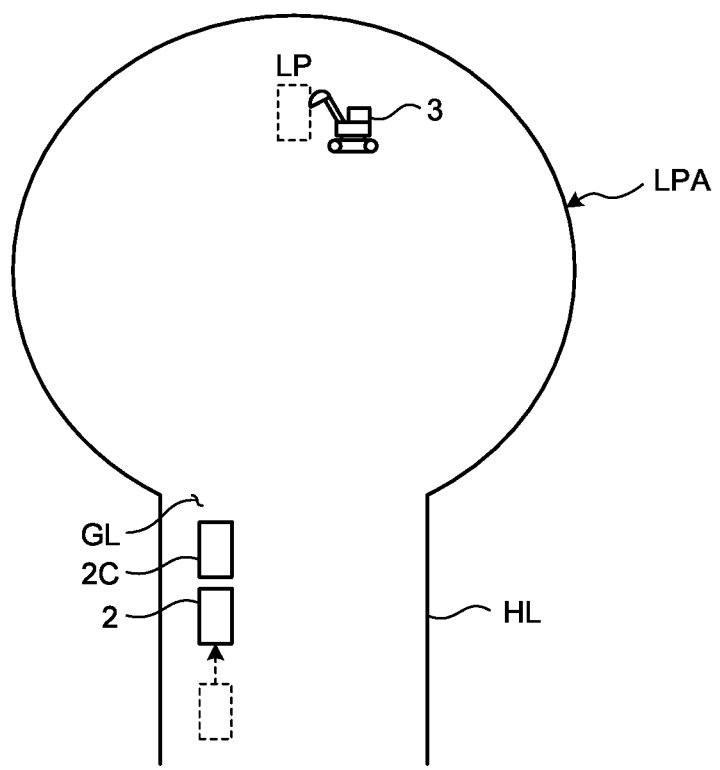
FIG. 9 is a schematic diagram illustrating an example of an operation of the dump truck according to the present embodiment.

FIG. 9 is a schematic diagram illustrating an example of the loading site LPA. A loading work by the loading machine 3 is performed on a dump truck 2 positioned at the loading position LP at the loading site LPA. FIG. 9 illustrates a state where a dump truck 2C is waiting at the entrance GL of the loading site LPA. The wait operation of the dump truck 2C at the entrance GL is started when the dump truck 2C arrives at the entrance GL and the travelling of the dump truck 2C is stopped. A next dump truck 2 may arrive behind the dump truck 2C which is in the wait state at the entrance GL of the loading site LPA. In the case in which the dump truck 2C is waiting at the entrance GL, the dump truck 2 which has arrived behind the dump truck 2C stops travelling behind the dump truck 2C at a predetermined distance (about 5 m to 10 m) and waits.

Additionally, the dump truck 2 may have to wait at the entrance GL until the dump truck 2C ahead enters the loading site LPA, or until a predetermined time has elapsed after the dump truck 2C ahead entered the loading site LPA and the loading work started at the loading position LP. Also, depending on the mining situation or the like, the loading position LP may change within the loading site LPA, and the dump truck 2 may have to wait at the entrance GL of the loading site LPA until a travel route CS corresponding to the loading position LP after change is created.

The GPS position of the dump truck 2C is detected by the position detection device 29 installed in the dump truck 2C, and the GPS position of the dump truck 2 is detected by the position detection device 29 installed in the dump truck 2. Detection results of the position detection device 29 of the dump truck 2C and the position detection device 29 of the dump truck 2 are output to the processing device 12 through the communication system 9. The processing device 12 may determine whether or not the dump truck 2C has arrived at the entrance GL, based on the detection results of the position detection device 29 of the dump truck 2C. Also, the processing device 12 may determine whether or not the dump truck 2 has arrived behind the dump truck 2C which is in the wait state at the entrance GL, based on the detection results of the position detection device 29 of the dump truck 2C and the detection results of the position detection device 29 of the dump truck 2. In the present embodiment, the processing device 12 determines that the dump truck 2 has arrived at the entrance GL, when the dump truck 2 has arrived behind the dump truck 2C which is in the wait state at the entrance GL.

Also, the processing device 12 specifies the time when an empty dump truck 2 has arrived behind the dump truck 2C which is in the wait state at the entrance GL as the arrival time when the dump truck 2 has arrived at entrance GL. In the present embodiment, the processing device 12 specifies the time when the dump truck 2 has arrived behind the dump truck 2C which is in the wait state at the entrance GL as the end time Te4 of the empty travelling operation of the dump truck 2.

The wait operation of the dump truck 2 at the entrance GL is started when the dump truck 2 arrives behind the dump truck 2C which is in the wait state at the entrance GL and travelling of the dump truck 2 is stopped (step SA9). The processing device 12 specifies the time when the dump truck 2 has arrived behind the dump truck 2C which is in the wait state at the entrance GL as a start time Ts5 of the entrance wait operation of the dump truck 2. That is, in the present embodiment, the end time Te4 of the empty travelling operation is the same as the start time Ts5 of the entrance wait operation.

After at least one of the dump trucks 2 at the loading site LPA moves out of the loading site LPA, and a state is reached where the dump truck 2 waiting at the entrance GL may enter the loading site LPA, the processing device 12 outputs (transmits) an instruction signal regarding start of travelling to the dump truck 2 waiting at the entrance GL. The wait state of the dump truck 2 is thereby released, and the entrance wait operation is ended (step SA10). The dump truck 2 whose wait state has been released starts travelling and enters the loading site LPA from the entrance GL along the travel route CS.

The processing device 12 specifies the time when the dump truck 2 in the wait state at the entrance GL has started travelling (re-started) as an end time Te5 of the entrance wait operation of the dump truck 2. The processing device 12 specifies the end time Te5 based on the position information of the dump truck 2 output from the position detection device 29. When the wait state is released and the dump truck 2 starts travelling, the position of the dump truck 2 changes, and thus, the processing device 12 is enabled to determine whether or not the dump truck 2 has left the wait position at the entrance GL, based on the information about the GPS position of the dump truck 2 output from the position detection device 29. The processing device 12 determines whether or not the dump truck 2 has started to move from the wait position at the entrance GL, based on the detection results of the position detection device 29, and specifies the time when the dump truck 2 has started to move from the wait position at the entrance GL as the end time Te5 of the entrance wait operation of the dump truck 2. Additionally, the processing device 12 may specify the time when the wait state of the dump truck 2 at the entrance GL is released and an instruction signal for start of travelling is output, as the end time Te5.

When the entrance wait operation is ended, the dump truck 2 starts the spot operation (step SA1). The spot operation refers to an operation from release of the wait state at the wait position at the entrance GL to movement to the loading position LP at the loading site LPA. In the present embodiment, the processing device 12 specifies the time when the dump truck 2 has started to move from the wait position at the entrance GL as a start time Ts6 of the spot operation, based on the position information of the dump truck 2 output from the position detection device 29. That is, in the present embodiment, the end time Te5 of the entrance wait operation is the same as the start time Ts6 of the spot operation. Additionally, the processing device 12 may specify the time when the wait state of the dump truck 2 at the entrance GL is released and an instruction signal for start of travelling is output, as the start time Ts6. Additionally, in the present embodiment, in the case in which a predetermined number of dump trucks 2 are already present at the loading site LPA, a dump truck 2 which has arrived at the entrance GL of the loading site LPA is placed in the wait state, but in the case in which a predetermined number of dump trucks 2 are not present at the loading site LPA (in the case in which the loading site LPA is more or less empty), the dump truck 2 which has arrived at the entrance GL of the loading site LPA may enter the loading site LPA without stopping (waiting) at the entrance GL, and may travel to the loading position LP. In this case, the time when the dump truck 2 has passed the entrance GL of the loading site LPA may be specified as the end time Te4 of the empty travelling operation of the dump truck 2, or as the start time Ts6 of the spot operation.

The dump truck 2 travels along the travel route CS generated by the processing device 12, and moves from the entrance GL to the loading position LP. The spot operation is thus ended (step S12). The processing device 12 specifies the time when the dump truck 2 has arrived at the loading position LP as an end time Te6 of the spot operation. The processing device 12 determines whether or not the dump truck 2 is positioned at the loading position LP, based on the information about the GPS position of the dump truck 2 output from the position detection device 29, and specifies the time when the dump truck 2 is positioned at the loading position LP as the end time Te6 of the spot operation of the dump truck 2.

The spot operation may be divided into a first spot operation and a second spot operation. For example, at the time the dump truck 2 enters the loading position LP, a so-called switchback operation according to which the dump truck 2 moves forward from the entrance GL and enters the loading site LPA with the front of the dump truck 2 facing toward the loading position LP, and then, a steering operation is performed for the dump truck 2 such that the rear of the dump truck 2 faces toward the loading position LP, and then, the dump truck 2 moves backward and enters the loading position LP is likely to be performed. In this case, the dump truck 2 sometimes waits at a predetermined position (a switchback position), at the loading site LPA, away from the loading position LP before starting to move backward. In this case, in the processing device 12, the operation in which the dump truck 2 moves to the switchback position after the wait state at the wait position at the entrance GL is released is taken as the first spot operation, and the operation in which the dump truck 2 moves from the switchback position to the loading position LPA is taken as the second spot operation. The processing device 12 may specify the start time and the end time of the first spot operation of the dump truck 2, and the start time and the end time of the second spot operation.

In the present embodiment, the end time Te6 of the spot operation is the same as the start time Ts1 of the loading operation. The loading work is performed for the dump truck 2 that is positioned at the loading position LP.

Additionally, in the case in which the dump truck 2 stops travelling on the haul road HL, the processing device 12 specifies a start time Ts7 and an end time Te7 of the travelling stop operation of the dump truck 2. The processing device 12 may specify the start time Ts7 and the end time Te7 of the travelling stop operation on the haul road H1 based on the GPS position of the dump truck 2 output from the position detection device 29. Since the GPS position of the dump truck 2 does not change when the travelling of the dump truck 2 is stopped, and the GPS position of the dump truck 2 changes when the dump truck 2 in a travelling stop state starts to travel, the processing device 12 may specify the start time Ts7 and the end time Te7 of the travelling stop operation based on the GPS position of the dump truck 2. Additionally, the processing device 12 may also specify the start time Ts7 and the end time Te7 of the travelling stop operation based on the detection results of the speed sensor 27 of the dump truck 2.

Heretofore, one cycle has been described. The same cyclic operation is performed thereafter. Also, at a mine, a plurality of dump trucks 2 operate, and the start time (Ts1 to Ts7) and the end time (Te1 to Te7) of each operation are specified for each of the plurality of dump trucks 2. Each of the plurality of dump trucks 2 has an identifier (ID), and the processing device 12 specifies the start time (Ts1 to Ts7) and the end time (Te1 to Te7) of each operation for each of the plurality of dump trucks 2, in association with an identifier.

The processing device 12 may derive the time length which was required for each operation, based on the start time (Ts1 to Ts7) and the end time (Te1 to Te7) of each operation of each of the plurality of dump trucks 2. For example, the processing device 12 may calculate the entrance wait time length of a dump truck 2 from the arrival time of the dump truck 2 at the entrance GL to the release of the wait state at the entrance GL, based on the start time Ts5 and the end time Te5.

<Example of Specification of Start Time of Loading Operation>

In the embodiment described above, the loading position LP is set at one side of the loading machine 3, and empty dump trucks 2 are sequentially positioned at the loading position LP, and the time when an empty dump truck 2 is positioned at the loading position LP is assumed to be the start time Ts1 of the loading operation. The loading positions LP may be set, at the loading site LPA, on both sides of the loading machine 3, and a dump truck 2 is positioned at the loading position LP on one side while a loading work for a dump truck 2 positioned at the loading position LP on the other side is being performed. An example of specification of the start time of the loading operation for a case where the loading positions LP are set on both sides of the loading machine 3, and the loading work of a load is performed for each of the dump trucks 2 positioned at the loading positions LP on both sides (loading work on both sides) will be described.

Figure 10:
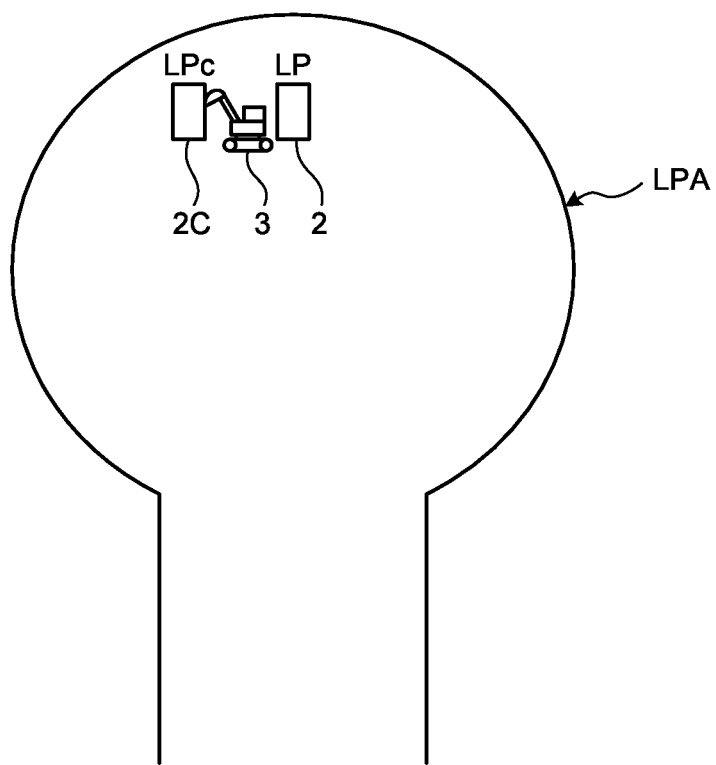
FIG. 10 is a schematic diagram illustrating an example of an operation of the dump truck according to the present embodiment.
Figure 11:
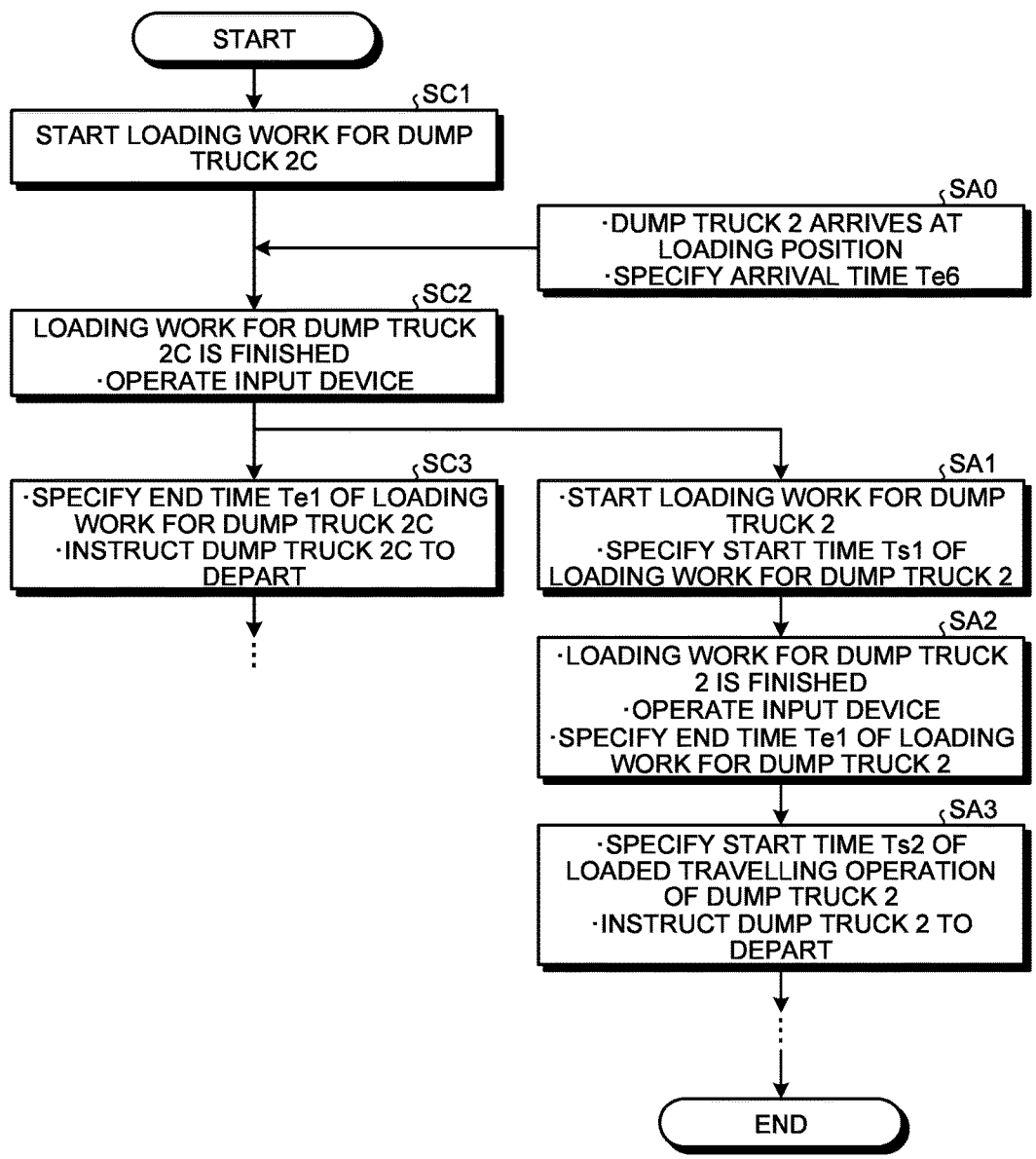
FIG. 11 is a flow chart illustrating an example of an operation in one cycle of the dump truck according to the present embodiment.

FIG. 10 is a schematic diagram illustrating an example of the loading site LPA, and FIG. 11 is a flow chart illustrating an example of the loading work. As illustrated in FIG. 10, in the present embodiment, a loading work for a dump truck 2C positioned at a loading position LPc at the loading site LPA is performed by the loading machine 3 (step SC1). The loading position LPc is set at one side of the loading machine 3. Information about the GPS position of the dump truck 2C at the time of the loading work at the loading position LPc is output to the processing device 12 of the management device 10 through the communication system 9.

When the loading work for the dump truck 2C is finished, the input device 31 is operated by the worker WM on the loading machine 3 (step SC2). The worker WM presses (operates) the input button when the loading work for the dump truck 2C is finished. An operation signal generated by the input device 31 is output to each of the processing device 12 of the management device and the processing device of the dump truck 2C through the communication system 9.

The processing device 12 specifies the end time Te1 of the loading operation of the dump truck 2C based on the operation signal generated by the input device 31 at the time of end of the loading work (step SC3). The end time Te1 of the loading operation of the dump truck 2C includes the start time Ts2 of the loaded travelling operation of the dump truck 2C.

The operation signal generated by the input device 31 at the time of end of the loading work for the dump truck 2C (step SC2) includes an instruction signal for the dump truck 2C to leave the loading position LPc. When the operation signal generated by the input device 31 is input to the processing device of the dump truck 2C through the communication system 9, the dump truck 2C leaves the loading position LPc for the dumping site DPA. Additionally, the processing device 12 of the management device which has received the operation signal from the input device 31 may alternatively instruct, through the communication system 9, the dump truck 2C to leave the loading position LPc.

When the loading work for the dump truck 2C is finished, a loading work of loading a load onto a dump truck 2 positioned at the loading position LP is performed by the loading machine 3 (step SA1). In the present embodiment, the dump truck 2 arrives at the loading position LP before the loading work for the dump truck 2C is finished (step SA0). The loading position LP is a position different from the loading position LPc, and is set on the other side of the loading machine 3. That is, in the present embodiment, the dump truck 2 is already positioned at the loading position LP different from the loading position LPc during the loading work of loading a load onto the dump truck 2C positioned at the loading position LPc. The dump truck 2 which has arrived at the loading position LP waits (stops travelling) at the loading position LP until the loading work for the dump truck 2C is finished.

As illustrated in FIG. 10, the loading position LPc and the loading position LP are different positions, and in the present embodiment, the loading position LPc is set on one side of the loading machine 3, and the loading position LP is set on the other side of the loading machine 3. After the loading work for the dump truck 2C positioned at the loading position LPc is finished, the loading machine 3 swings and performs the loading work for the dump truck 2 which has already been positioned at the loading position LP during the loading work for the dump truck 2C. The loading position LPc and the loading position LP are included in the travel route CS, for example, and are specified by the processing device 12. The loading machine 3 performs the loading work for the dump truck 2C and the dump truck 2 positioned on both sides (loading work on both sides).

The arrival time of the dump truck 2 at the loading position LP is the end time Te6 of the spot operation of the dump truck 2, and is obtained based on the information about the GPS position of the dump truck 2. The processing device 12 obtains the GPS position of the dump truck 2 based on the detection results of the position detection device 29, and specifies (sets) the arrival time Te6 based on the GPS position of the dump truck 2. The processing device 12 may specify the arrival time Te6 based on at least one of the detection results of the speed sensor 27 and the information about the GPS position of the dump truck 2.

The operation signal generated by the input device 31 in step SC2 is a notification signal regarding end of the loading work for the dump truck 2C and an instruction signal for the dump truck 2C to leave the loading position LPc, and is also a notification signal for start of the loading work for the dump truck 2. The operation signal generated by the input device 31 is output to each of the processing device 12 of the management device and the processing device of the dump truck 2 through the communication system 9. The processing device 12 specifies (sets) the start time Ts1 of the loading work for the dump truck 2 based on the operation signal that is generated by the input device 31 when the loading work for the dump truck 2C has finished. That is, in the present embodiment, the processing device 12 specifies the start time Ts1 of the loading work for the dump truck 2 based on the operation signal that is generated by the input device 31 at the time of start of the loading work.

In the present embodiment, the time from the arrival time Te6 of the dump truck 2 at the loading position LP to the start time Ts1 when the loading work for the dump truck 2 is started is the wait time (stopped time) of the dump truck 2 at the loading position LP. As described above, the arrival time Te6 is specified based on the detection results of the position detection device 29, and the start time Ts1 is specified based on the operation signal that is generated by the input device 31 when the loading work for the dump truck 2C is finished. The processing device 12 specifies the time when the operation signal is input from the input device 31 in a state where the dump truck 2 is present at the loading position LP as the start time Ts1. That is, the start time Ts1 is the time when the input device 31 is operated and an operation signal is generated in a state where the loading position LP specified by the processing device 12 and the GPS position of the dump truck 2 detected by the position detection device 29 coincide with each other. The processing device 12 derives the wait time from the arrival time Te6 of arrival of the dump truck 2 at the loading position LP to the start time Ts1 of the loading work, based on the detection results of the position detection device 29 and the operation signal that is generated by the input device 31 when the loading work for the dump truck 2C is finished.

When the loading work for the dump truck 2 is finished, the input device 31 is operated by the worker WM on the loading machine 3 (step SA2). The operation signal generated by the input device 31 is output to each of the processing device 12 of the management device and the processing device of the dump truck 2 through the communication system 9. The processing device 12 specifies the end time Te1 of the loading work for the dump truck 2 based on the operation signal that is generated by the input device 31 when the loading work for the dump truck 2 is finished.

In the present embodiment, the operation signal that is generated by the input device 31 at the time of end of the loading work for the dump truck 2 (step SA2) includes an instruction signal for the dump truck 2 to leave the loading position LP. The processing device 12 specifies the start time Ts2 of the loaded travelling operation of the dump truck 2 based on the operation signal that is generated by the input device 31 at the time of end of the loading work for the dump truck 2 (step SA2). The processing device 12 specifies the time when the operation signal is generated by the input device 31 (the time when the operation signal is input to the processing device 12) as the start time Ts2 (step SA3). When the operation signal generated by the input device 31 is input to the processing device of the dump truck 2 through the communication system 9, the dump truck 2 leaves the loading position LP for the dumping site DPA.

Additionally, in the case in which the next dump truck 2 arrives at the loading position LPc during the loading work for the dump truck 2, the start time Ts1 of the loading work for the next dump truck 2 is specified based on the operation signal that is generated by the input device 31 at the end of the loading work for the dump truck 2 (step SA2).

<Vehicle Deployment Instruction>

The processing device 12 outputs, to a dump truck 2, an assignment instruction for the dump truck 2 at the mine, based on the position information of each of a plurality of dump trucks 2. Additionally, a signal regarding the assignment instruction may be output based on the operation of the input device 17 by a worker, or the processing device 12 may calculate the assignment of a dump truck 2 and automatically output the signal. The processing device 12 specifies the start time and end time of each operation of the plurality of dump trucks 2 based on the position information of the dump trucks 2, and accurately grasps the position information and time information (start time and end time) of a dump truck 2 associated with each operation of the dump truck 2. Accordingly, the processing device 12 may appropriately perform vehicle deployment management based on the position information and the time information of the dump trucks 2 associated with each operation of the dump trucks 2, and may output vehicle deployment instructions (assignment instructions). For example, in the case in which there are a plurality of loading sites LPA at a mine, the processing capacities of the loading machines 3 (for example, the number of dump trucks 2 for which the loading work may be performed per unit time) at respective loading sites LPA may be different. In this case, if the number of dump trucks 2 assigned to a loading machine 3 with a low processing capacity is great, for example, the number of dump trucks 2 having to wait for the loading work may increase and the productivity of the mine may be reduced. According to the present embodiment, the processing device 12 may derive the number of dump trucks 2 to be assigned to each loading site LPA (the loading machine 3), based on the accurate time information of the dump truck 2 associated with each operation of the dump truck 2, such that the productivity at the mine is prevented from being reduced (such that the number of dump trucks 2 having to wait for the loading work is not increased). The processing device 12 may output the derived assignment of the dump trucks 2 to each of a plurality of dump trucks 2.

Furthermore, in the case in which a plurality of haul roads HL are provided to lead to a plurality of loading sites LPA and dumping sites DPA, the travelling time length (loaded travelling time length, empty travelling time length) of the dump truck 2 on the haul road HL may be different for each haul road HL depending on the property of the haul road HL (the angle of the slope, the number of curves, the state of the road surface, etc.). Also, the travelling time length of the dump truck 2 on the haul road HL may be different depending on the work situation, such as maintenance work, of the haul road HL. Furthermore, the travelling time length of the dump truck 2 on the haul road HL may change depending on the number of intersections of the haul road HL. Furthermore, in the case in which the dump truck 2 passes an intersection while travelling on the haul road HL, the travelling time length of the dump truck 2 from a first position on the haul road HL to the intersection and the travelling time length of the dump truck 2 from the intersection of the haul road HL to a second position may be different depending on the property or the work situation of the haul road HL. Moreover, for example, in the case in which the haul road HL is branched from the intersection of the haul road HL into a haul road HL leading to a first loading site LPA and a haul road HL leading to a second loading site LPA, the travelling time length of the dump truck 2 travelling on the haul road HL leading to the first loading site LPA and the travelling time length of the dump truck 2 travelling on the haul road HL leading to the second loading site LPA may be different depending on the property, the work situation and the like of each of the haul road HL leading to the first loading site LPA and the haul road HL leading to the second loading site DPA. Moreover, for example, in the case in which the haul road HL is branched from the intersection of the haul road HL into a haul road HL leading to a first dumping site DPA and a haul road HL leading to a second dumping site DPA, the travelling time length of the dump truck 2 travelling on the haul road HL leading to the first dumping site DPA and the travelling time length of the dump truck 2 travelling on the haul road HL leading to the second dumping site DPA may be different depending on the property, the work situation and the like of each of the haul road HL leading to the first dumping site DPA and the haul road HL leading to the second dumping site DPA. That is, a situation where the travelling speed of the dump truck 2 has to be limited may arise depending on the property or the situation of the haul road HL, and the travelling time length of the dump truck 2 on the haul road HL is likely to be changed as a result. According to the present embodiment, the operation of the dump truck 2, the position information and the time information, such as the time required by the dump truck 2 to travel (loaded travelling, empty travelling) on each haul road HL, are associated and accurately grasped, and thus, the processing device 12 may appropriately perform vehicle deployment management or vehicle deployment instruction in such a way as to prevent low-speed travelling of the dump truck 2 or traffic jams. Also, for example, in the case in which the haul road HL is branched from the intersection of the haul road HL into the haul road HL leading to the first loading site LPA and the haul road HL leading to the second loading site LPA, an assignment instruction may be output to a dump truck 2 which has left the dumping site DPA to pass the intersection of the haul road HL and head to the first loading site LPA to cause the dump truck 2 to travel on the haul road HL toward the second loading site LPA, so as to prevent low-speed travelling of the dump truck 2 or traffic jams on the haul road HL leading to the first loading site LPA or at the entrance of the first loading site LPA. Also, for example, in the case in which the haul road HL is branched from the intersection of the haul road HL into the haul road HL leading to the first dumping site DPA and the haul road HL leading to the second dumping site DPA, an assignment instruction may be output to a dump truck 2 which has left the loading site LPA to pass the intersection of the haul road HL and head to the first dumping site DPA to cause the dump truck 2 to travel on the haul road HL toward the second dumping site DPA, so as to prevent low-speed travelling of the dump truck 2 or traffic jams on the haul road HL leading to the first dumping site DPA.

For example, in the case in which the dump truck 2 is not able to travel at high speed, such as at the time of rain, if only a small number of dump trucks 2 are deployed at the mine, a time gap may occur from the end of a loading work for a dump truck 2 by the loading machine 3 to the arrival of the next dump truck 2 at the loading position LP, and the loading machine 3 is placed in a wait state until the next dump truck 2 arrives, and the productivity is reduced. In the present embodiment, the processing device 12 accurately grasps the position information and the time information (the time length required for an operation) that are associated with each operation of the dump truck 2, and thus, the appropriate number of dump trucks 2 to be deployed at the mine may be determined based on these pieces of information. At the same time, in the case in which there are too many dump trucks 2 deployed at the mine, the processing device 12 may determine the appropriate number of dump trucks 2 to be deployed at the mine.

As described above, according to the present embodiment, the start time and the end time of a predetermined operation of the dump truck 2 are specified based on the position information of the dump truck 2, and thus, the start time and the end time of a predetermined operation associated with the position information of the dump truck 2 may be accurately obtained. That is, according to the present embodiment, the position information and the time information of the dump truck 2 for performing an operation may be accurately obtained in association with each of a plurality of operations of the dump truck 2, and thus, an accurate vehicle deployment state (assignment state, operation state) of the dump trucks 2 at the mine may be acquired. Accordingly, appropriate vehicle deployment management (assignment management) that prevents reduction in the productivity of the mine may be performed based on the acquired vehicle deployment state.

That is, in the case in which only the time length required for a predetermined operation of the dump truck 2 is acquired, for example, it may be difficult to immediately perform vehicle deployment management that would prevent an increase in the number of dump trucks 2 having to wait for the loading work or vehicle deployment management that would prevent traffic jams on the haul road HL. According to the present embodiment, the processing device 12 may grasp, for each dump truck 2, how long it takes to perform which operation at which position of the mine, and thus, a plurality of dump trucks 2 may be made to travel to appropriate sites (loading site LPA, dumping site DPA) without having to wait a long time or without traffic jams, for example.

Also, in the present embodiment, a dump truck 2 is determined to have arrived at the entrance GL of a loading site LPA when the dump truck 2 has arrived at a position (wait position) behind a dump truck 2C which is in a wait state at the entrance GL, separated from the dump truck 2C by a predetermined distance. Accordingly, even if the dump truck 2C is waiting at the entrance GL, the empty travelling time length of the dump truck 2 may be accurately obtained. Thus, appropriate vehicle deployment management may be performed based on the empty travelling time length obtained, in such a way that the number of dump trucks 2 that have to wait for the loading work at respective loading sites LPA is not increased.

Also, as described with reference to FIGS. 10 and 11, in the case in which the loading positions LP are set on both sides of the loading machine 3, if the next dump truck 2 arrives at the loading position LP while a loading work is being performed for the previous dump truck 2C at the loading site LP (loading position LPc), the start time Ts1 of the loading work for the dump truck 2 is specified based on the operation signal that is generated by the input device 31 at the end of the loading work for the dump truck 2C, and thus, appropriate vehicle deployment management may be performed while taking into account the wait time between the arrival time Te6 of the arrival of the dump truck 2 at the loading position LP and the start time Ts1.

Furthermore, according to the present embodiment, the operation signal that is generated by the input device 31 at the end of the loading work is used for specification of the end time Te1 and the start time Ts2, and also, as an instruction signal for the dump truck 2 to leave the loading position LP. Thus, if the input device 31 is not operated, the dump truck 2 does not leave the loading position LP, and stays at the loading position LP. The worker WM is thus prevented from forgetting to operate the input device 31.

Additionally, in the embodiment described above, the position information of the dump truck 2 is detected by using the GPS, but the method of detecting the position information of the dump truck 2 is not limited to the method of using the GPS. For example, the position information of the dump truck 2 may alternatively be obtained by dead-reckoning navigation by using a gyro sensor and a speed sensor installed in the dump truck 2.

Moreover, in the embodiment described above, the processing device 12 may obtain the time length required for one cycle (cycle time length) from the time length required for each of a plurality of operations of the dump truck 2. For example, the processing device 12 may obtain the cycle time length from the start time Ts1 and the start time Ts1 after one cycle. Also, the processing device 12 may obtain the cycle time length from the start time Ts2 (end time Te1) specified based on the operation signal generated by the input device 31 and the start time Ts2 (end time Te1) after one cycle.

Furthermore, the site situation at the mine (mining state, work state, etc.) changes from moment to moment, and the travelling stop time length on the haul road HL may also change accordingly. In the case in which the cycle time length not influenced by the situation at the site (cycle time length not including the travelling stop time length on the haul road HL) is desired to be obtained, the sum of the time lengths required for the operations described above (dumping work time length, empty travelling time length, entrance wait time length, spot time length, loading work time length) may be obtained.

Moreover, as illustrated in FIG. 12, for example, the cycle time length (reference cycle time length) not influenced by the situation at the site may also be obtained by subtracting the travelling stop time length on the haul road HL from the time length between the start time Ts1 and the start time Ts1 after one cycle (total cycle time length).

Additionally, a cycle time length which is obtained by subtracting the travelling stop time length on the haul road HL and the entrance wait time length from the total cycle time length may also be obtained.

Moreover, in the case in which the loading positions LP are set on both sides of the loading machine 3, as described with reference to FIGS. 10 and 11, a cycle time length which is obtained by subtracting the travelling stop time length on the haul road HL and the wait time length at the loading position LP (the time length between the arrival time Te6 at the loading position LP and the start time Ts1 of the loading operation) from the total cycle time length, or a cycle time length which is obtained by subtracting the travelling stop time length on the haul road HL, the entrance wait time length, and the wait time length at the loading position LP from the total cycle time length may be obtained.

Additionally, vehicle deployment management with respect to the dump trucks 2 at the mine (the number of dump trucks 2 to be deployed at the mine, etc.) may be performed based on the cycle time length that is not influenced by the situation at the site.

Moreover, in the embodiment described above, the dump truck 2 may be a so-called manned dump truck that is operated by a worker (driver).

The structural elements of the embodiment described above include those that may be easily conceived by those skilled in the art, those that are substantially the same, i.e. those that are equivalent. Also, the structural elements of the embodiment described above may be used in combination as appropriate. Also, some of the structural elements may not have to be used.

REFERENCE SIGNS LIST

1 MANAGEMENT SYSTEM
2 DUMP TRUCK (HAUL MACHINE)
3 LOADING MACHINE
9 COMMUNICATION SYSTEM
10 MANAGEMENT DEVICE
12 PROCESSING DEVICE
13 STORAGE DEVICE
18 WIRELESS COMMUNICATION DEVICE
20 PROCESSING DEVICE
25 STORAGE DEVICE
28 WIRELESS COMMUNICATION DEVICE
29 POSITION DETECTION DEVICE
29A ANTENNA
30 PROCESSING DEVICE
31 INPUT DEVICE
32 WIRELESS COMMUNICATION DEVICE
33 POSITION DETECTION DEVICE
39 STORAGE DEVICE
DP DUMPING POSITION
DPA DUMPING SITE
HL HAUL ROAD
LP LOADING POSITION
LPA LOADING SITE

The invention claimed is:

1. A management system of a mining machine comprising:
    an input device provided to a loading machine, the loading machine performing, after a first loading work of loading a load onto a first transporting machine positioned at a first loading position at a loading site of a mine is performed and ended by the loading machine, a second loading work of loading a load onto a second transporting machine that is already positioned when the loading machine is performing the first loading work, at a second loading position different from the first loading position, the first loading position and the second loading position being located on both sides of the loading machine; and
    a processing device which receives an operation signal generated by the input device and which is placed in a different position from those of the loading machine and a transporting machine,
    wherein the processing device specifies a start time of the second loading work of the second transporting machine positioned at the second loading position, by the loading machine, based on the operation signal generated by the input device at a time when the first loading work is ended, and outputs a vehicle deployment instruction corresponding to the operation signal to the first transporting machine.

2. The management system according to claim 1, wherein the processing device specifies an end time of the second loading work based on the operation signal generated by the input device at a time when the second loading work is ended.

3. The management system according to claim 2, wherein the operation signal generated by the input device at the time when the second loading work is ended includes an instruction signal for the second transporting machine to leave the second loading position.

4. The management system according to claim 1, wherein the operation signal generated by the input device at the time when the first loading work is ended includes an instruction signal for the first transporting machine to leave the first loading position.

5. The management system according to claim 1, comprising:
    a position detection device that detects position information of the second transporting machine, wherein the processing device calculates a wait time length from a time when the second transporting machine arrives at the second loading position to a time when the second loading work is started, based on a detected result by the position detection device and the operation signal generated by the input device at the time when the first loading work is ended.

6. The management system according to claim 5, wherein the transporting machine travels at the loading site and a dumping site where a dumping work of a load is to be performed, and on a haul road connecting the loading site and the dumping site, and
wherein the processing device specifies a start time of an operation of the second transporting machine travelling in a loaded state, based on the operation signal generated by the input device at the time when the second loading work is ended.

7. The management system according to claim 5, wherein the processing device specifies, based on position information of the second transporting machine output from the position detection device, a start time and an end time of at least one of an operation of travelling of the second transporting machine in an unloaded state, an operation of moving to a loading position at the loading site after a wait state at a wait position at an entrance of the loading site is released, and an operation of having a load loaded by the loading machine at the loading position.

8. The management system according to claim 1, wherein the processing device calculates a time length required for a cyclic operation of the second transporting machine moving between the loading site and a dumping site where a dumping work of a load is to be performed.

9. A management method for managing a mining machine comprising:
receiving at a processing device an operation signal generated by an input device provided to the loading machine that performs, after a first loading work of loading a load onto a first transporting machine positioned at a first loading position at a loading site of a mine is performed and ended by the loading machine, a second loading work of loading a load onto a second transporting machine that is already positioned when the loading machine is performing the first loading work, at a second loading position different from the first loading position, the processing device being placed in a different position from those of the loading machine and a transporting machine, the first loading position and the second loading position being located on both sides of the loading machine; and
specifying a start time of the second loading work of the second transporting machine positioned at the second loading position, by the loading machine, based on the operation signal generated by the input device at a time when the first loading work is ended, and outputting a vehicle deployment instruction corresponding to the operation signal to the first transporting machine.

10. The management system according to claim 1, wherein the first and second loading positions are set, at the loading site, on both sides of the loading machine, and the second transporting machine is positioned at the second loading position while the first work for the first transporting machine positioned at the first loading position is being performed.

* * * * *